(12) United States Patent
O'Dowd

(10) Patent No.: US 8,727,000 B2
(45) Date of Patent: May 20, 2014

(54) METHOD OF LIQUEFACTION OF CARBONACEOUS MATERIAL TO LIQUID HYDROCARBON

(75) Inventor: Peter John O'Dowd, Nuriootpa (AU)

(73) Assignee: Forbes Oil and Gas Pty. Ltd., Houghton, South Australia (AU)

( * ) Notice: Subject to any disclaimer, the term of this patent is extended or adjusted under 35 U.S.C. 154(b) by 451 days.

(21) Appl. No.: 13/056,497

(22) PCT Filed: Jul. 28, 2009

(86) PCT No.: PCT/AU2009/000958
§ 371 (c)(1),
(2), (4) Date: Apr. 8, 2011

(87) PCT Pub. No.: WO2010/012027
PCT Pub. Date: Feb. 4, 2010

(65) Prior Publication Data
US 2011/0180262 A1  Jul. 28, 2011

(30) Foreign Application Priority Data

Jul. 28, 2008 (AU) ............................... 2008903840
Jul. 28, 2008 (AU) ............................... 2008903845

(51) Int. Cl.
*E21B 43/24* (2006.01)
*C09K 8/60* (2006.01)

(52) U.S. Cl.
USPC .................... 166/303; 166/272.1; 166/272.6; 166/400

(58) Field of Classification Search
None
See application file for complete search history.

(56) References Cited

U.S. PATENT DOCUMENTS 3,235,006 A * 2/1966 Hujsak .......................... 166/302
3,498,381 A    3/1970 Earlougher, Jr.
(Continued)

FOREIGN PATENT DOCUMENTS

| EP | 303504 | 2/1989 |
|---|---|---|
| GB | 145906 A | 7/1920 |
| JP | 2002-275478 | 9/2002 |
| JP | 2002275478 A | 9/2002 |

OTHER PUBLICATIONS

International Search Report for WO Application No. PCT/AU2009/000958, dated Oct. 7, 2009.

(Continued)

*Primary Examiner* — Angela M DiTrani
*Assistant Examiner* — Anuradha Ahuja
(74) *Attorney, Agent, or Firm* — Calfee, Halter & Griswold LLP

(57) ABSTRACT

The present invention provides a method of liquefying a carbonaceous material in situ to produce liquid hydrocarbon comprising applying an aqueous solution to the carbonaceous material to facilitate a liquefaction reaction in a reaction zone in the carbonaceous material that liquefies the carbonaceous material to liquid hydrocarbon, wherein the aqueous solution comprises components selected from the group consisting of water, hydrogen peroxide at a (w/w) concentration range between 0.1% to 70%, methanol at a (w/w) concentration range between 0.1% to 30%, and a catalyst. The aqueous solution may be a superheated fluid, a supercritical fluid, a high-velocity superheated fluid or a high-velocity supercritical fluid. In an embodiment, the reaction zone is heated to a desired temperature by applying a first aqueous solution prior to applying a second aqueous solution that is a superheated fluid, a supercritical fluid, a high-velocity superheated fluid or a high-velocity supercritical fluid.

16 Claims, 7 Drawing Sheets

(56) References Cited

U.S. PATENT DOCUMENTS

| | | | | | |
|---|---|---|---|---|---|
| 3,734,184 | A | * | 5/1973 | Scott | 166/259 |
| 3,757,861 | A | * | 9/1973 | Routson | 166/400 |
| 3,815,826 | A | * | 6/1974 | Aldrich et al. | 241/1 |
| 3,850,477 | A | * | 11/1974 | Aldrich et al. | 299/5 |
| 3,850,738 | A | | 11/1974 | Stewart, Jr. et al. | |
| 3,960,702 | A | * | 6/1976 | Allred | 208/428 |
| 3,980,137 | A | | 9/1976 | Gray | |
| 4,085,033 | A | * | 4/1978 | Plumlee | 208/416 |
| 4,197,911 | A | * | 4/1980 | Anada | 166/261 |
| 4,398,604 | A | | 8/1983 | Krajicek et al. | |
| 4,434,043 | A | * | 2/1984 | Singhal et al. | 208/417 |
| 4,437,706 | A | | 3/1984 | Johnson | |
| 4,441,460 | A | | 4/1984 | Wyatt | |
| 4,443,321 | A | * | 4/1984 | Compton | 208/435 |
| 4,485,003 | A | * | 11/1984 | Coenen et al. | 208/417 |
| 4,501,445 | A | | 2/1985 | Gregoli | |
| 4,589,488 | A | * | 5/1986 | Schirmer | 166/257 |
| 4,818,370 | A | * | 4/1989 | Gregoli et al. | 208/106 |
| 4,867,238 | A | * | 9/1989 | Bayless et al. | 166/261 |
| 5,669,444 | A | * | 9/1997 | Riese et al. | 166/263 |
| 2002/0189975 | A1 | * | 12/2002 | De Souza | 208/208 R |
| 2003/0098262 | A1 | | 5/2003 | Rendall | |
| 2006/0191686 | A1 | * | 8/2006 | Blauch et al. | 166/300 |
| 2007/0056881 | A1 | | 3/2007 | Berkowitz et al. | |
| 2007/0181301 | A1 | | 8/2007 | O'Brien | |
| 2011/0211997 | A1 | | 9/2011 | O'Dowd | |

OTHER PUBLICATIONS

Written Opinion of the International Searching Authority for WO Application No. PCT/AU2009/000958, dated Oct. 7, 2009.
Adewuyi, Yusuf, 2001. "Sonochemistry: Environmental Science and Engineering Applications," Ind. Eng. Chem. Res., 40: 4681-4715.
Andrews, Graham, 1991. "Mass and Energy Balance Constraints on the Biological Production of Chemicals from Coal," Fuel, 70: 585-589.
Burton, E, Friedmann, SJ, Upadhye, R, 2006, Best Practices in Underground Coal Gasification (draft), Lawrence Livermore National Laboratory Report UCRL-TR-225331-DRAFT, 119 p.
Canel, M. & Missal, P., 1994. "Extraction of Solid Fuels with Sub- and Supercritical Water," Fuel, 73(11): 1776-1780.
Croiset, E, Rice, S.F., Hanush, R.G., 1997. "Hydrogen Peroxide Decomposition in Supercritical Water," AIChE Journal, 43(9): 2343-2352.
Franz, JA et al., "Fundamental Hydrogen Transfer Studies in Coal Liquefaction", Pacific Northwest Laboratory Report, available at http://www.anl.gov/PCS/acsfuel/preprint%20archive/Files/Volumes/Vol40-2.pdf.
Helgeson, H.C., Laurent Richard, William F.McKenzie, Denis L. Norton, Alexandra Schmitt, "A chemical and thermodynamic model of oil generation in hydrocarbon source rocks," Geochimica et Cosmochimica Acta, 73: 594-695.
Kershaw, John R., 1997. "Comments on the role of the solvent in supercritical fluid extraction of coal," Fuel, 76(5): 453-454.
Lewan, M.D., 1997. "Experiments on the role of water in petroleum formation," Geochimica et Cosmochimica Acta, 61 (17): 3691-3723.
Pomeroy CD, Morgans WTA, 1956, "The tensile strength of coal", British J. of Applied Physics, 7: 243-246.
Rauenzahn et al., 1989, Rock Failure Mechanisms of Flame-jet Thermal Spallation Drilling—Theory and Experimental Testing, Int. J. Rock Mech. Min. Sci. Geomech. Abst. 26(5): 381-399.
Scarrah, Warren P. and Kenneth L. Myklebust, Jr., 1986. "The supercritical fluid extraction of peat using water and aqueous organic solutions," Fuel, 65: 274-276.
Sharma, A., Gogate P.R., Mahulkar, A. and Pandit, A.B., 2008. "Modeling of hydrodynamic cavitation reactors based on orifice plates considering hydrodynamics and chemical reactions occurring in bubble," Chemical Engineering Journal, 143: 201-209.
Wang GX, Wang ZT, Rudolph V, Massarotto P, Finley RJ, 2007, "An analytical model of the mechanical properties of bulk coal under confined stress", Fuel 86: 1873-1884.
International Search Report for WO Application No. PCT/AU2009/000957, dated Sep. 28, 2009.
Written Opinion of the International Searching Authority for WO Application No. PCT/AU2009/000957, dated Sep. 28, 2009.
Isoda, Takaaki et al., "Structural Changes of Alcohol-Solubilized Yallourn Coal in the Hydrogenation over a Ru/Al2O3 Catalyst", Energy & Fuels, 2, pp. 503-511 (1998).
Mae, Kazuhiro et al., "Extraction of Low-Rank Coals Oxidized with Hydrogen Peroxide in Conventionally Used Solvents at Room Temperature", Energy & Fuels, 11, pp. 825-831 (1997).
Summers, David A. et al., Proceedings of the Second U.S. Water Jet Conference, 16 pgs. (1983).
Sugano, Motoyuki et al., "Effects of the oxidation pretreatment with hydrogen peroxide on the hydrogenolysis reactivity of coal liquefaction residue", Fuel Processing Technology, 77-78, pp. 67-73 (2002).
Communication from European Application No. 09802268.4 dated Jan. 6, 2012.
Communication from European Application No. 09802267.6 dated Jan. 4, 2012.
Office action from Chinese Application No. 200980138044.8 dated Feb. 20, 2013.
Office action from Chinese Application No. 200980129441.9 dated Mar. 21, 2013.
Office action from Eurasian Application No. 201100292/28 dated Jul. 2, 2013.
Office action from U.S. Appl. No. 13/056,493 dated Nov. 2, 2012.
Notice of Abandonment from U.S. Appl. No. 13/056,493 dated Jun. 4, 2013.

* cited by examiner

A

B

C

METHOD OF LIQUEFACTION OF CARBONACEOUS MATERIAL TO LIQUID HYDROCARBON

FIELD OF THE INVENTION

The present invention relates to a method for liquefying carbonaceous materials to produce liquid hydrocarbon. In an embodiment, the present invention relates to the liquefaction of carbonaceous material present in an in situ carbonaceous material formation, without the need to first remove the coal from the ground.

CROSS REFERENCE TO RELATED APPLICATIONS

The present application is the U.S. national phase entry of International Application No. PCT/AU2009/000958, filed on Jul. 28, 2009 titled "METHOD OF LIQUEFACTION OF CARBONACEOUS MATERIAL TO LIQUID HYDROCARBON", which claims priority to Australian Provisional Patent Application No. 2008903845 titled "METHOD FOR IN SITU LIQUEFACTION OF COAL", filed on Jul. 28, 2008, and Australian Provisional Patent Application No. 2008903840 titled "INVENTIVE JET PUMPING", filed on Jul. 28, 2008. The entire content of each of these applications are hereby incorporated by reference.

INCORPORATION BY REFERENCE

The following co-pending patent application is referred to in the following description: Patent Cooperation Treaty Patent Application No. PCT/AU2009/000957 titled "APPARATUS FOR LIQUEFACTION OF CARBONACEOUS MATERIALS" filed by the present inventor on Jul. 28, 2009, and published as WO 2010/012027 on Feb. 4, 2010. The entire content of this application is hereby incorporated by reference.

BACKGROUND OF THE INVENTION

Dwindling oil reserves and soaring oil prices have increased commercial interest in alternative fuels. Coal, oil sands and oil shale, by comparison, are found in higher abundance. These carbonaceous materials can be "liquefied" (ie converted to liquid hydrocarbons), and the produced liquid hydrocarbons can be processed to form many petroleum products such as petrol and diesel, thereby offering an alternative fuel source to traditional oil and oil products.

Coal can be found in a number of different forms determined by its organic maturity, with more mature forms considered to be higher quality or rank. The coal maturation pathway starts with peat, which turns into lignite (or brown coal), which is young, low rank coal. Lignite matures into sub-bituminous coal. Both lignite and sub-bitumous coal are soft, low rank coals characterised by high moisture levels and low carbon content, and accordingly, have low energy values. Higher rank coals such as bituminous coal and anthracite are generally harder and stronger, and have lower moisture content and higher carbon content, and accordingly, have a higher energy value. Graphite is the highest rank coal. Lower ranks of coal are usually found are found closer to the surface, and the rank of coal increases with depth. Industry has primarily been focussed on mining high rank coal that is close to the surface.

Liquid hydrocarbons can also be extracted from oil shale, which is a sedimentary rock that contains significant amounts of kerogen (a solid mixture of organic chemical compounds from which liquid hydrocarbons can be extracted). Liquid hydrocarbons can also be extracted from oil sands (also known as tar sands or bituminous sands), which are a naturally occurring mixture of sand or clay, water and a dense or viscous form of petroleum known as bitumen, which is considered a major source of unconventional oil.

Coal formations are complex and heterogeneous, and mixed ranks of coal, oil shale and/or oil sands are often found in the same coal formation. Coal formations are frequently ingrained with various impurities including mineralisations such as pyrene, pyrite and pyridine. Coal includes "volatile matter" which refers to the components of coal (other than moisture) which are released from coal at high temperature in the absence of air. The volatile matter is usually a mixture of short and long chain hydrocarbons, aromatic hydrocarbons and some sulphur. Chemically, coal has a matrix structure composed mainly of aromatic and hydroaromatic ring compounds containing carbon, hydrogen and oxygen atoms, which form clusters linked by ether or methylene bridges. Conversion of coal to liquid hydrocarbon requires the cleavage of chemical bonds between certain atoms in coal molecules, including the ether or methylene bridges.

Coal can be converted to liquid hydrocarbon by the Fischer-Tropsch Process, or "indirect" processes. In the Fischer-Tropsch process, mined and pulverised coal is first "gasified" (ie converted to a gaseous form) by "pyrolysis" (the term given to decomposition of a substance at very high temperatures) and then liquefied in above-ground purpose built reactors. Mined and pulverised coal is mixed with water to form a coal slurry. The coal slurry is gasified into carbon monoxide and hydrogen gases (a mixture known as synthesis gas or syngas) at high temperature (eg 700-1000° C.) and high pressure, in the presence of a catalyst, and in a carefully controlled oxygen concentration in a gasifier. The "Fischer-Tropsch reaction" then occurs, usually in a reactor, whereby the syngas mixture is reacted in the presence of a catalyst (usually an iron or cobalt catalyst) to produce a liquid hydrocarbon, water and carbon dioxide. The resulting hydrocarbons are then refined to form the desired synthetic fuel.

It is also possible to directly liquefy coal to produce liquid hydrocarbons using the Bergius process. In the Bergius process, mined and pulverised coal is directly liquefied by "hydrogenation", whereby chemical bonds (eg double bonds between two carbon atoms in a coal molecule) are reduced by a reaction that binds hydrogen atom(s) in above-ground purpose built reactors. Lignite (brown coal) or sub-bituminous coal is finely ground and mixed with heavy oil recycled from the process, in the presence of a catalyst (for example, tungsten, molybdenum sulphides, tin, or nickel oleate catalysts). The mixture is pumped into a reactor, and the hydrogenation reaction occurs at high temperature (eg 400-500° C.) and high pressure (eg 20-70 MPa hydrogen pressure), converting coal to liquid hydrogen in the presence of high pressure gaseous hydrogen.

The above methods of liquefying coal to liquid hydrocarbons do not efficiently utilise coal formations. This is in part because coal formations are complex and the above liquefaction processes tend to utilise high rank coal in coal formations that are relatively easy to access; and further, the coal is mined, pulverised and purified prior to liquefaction, removing many minerals, water, organic compounds and volatiles entrained within the coal formation. Additionally, the costs and input energy required to perform these processes is high relative to the liquid hydrogen product obtained, and further, the environmental footprint of these processes is undesirable.

Recently, there has been interest in the use of supercritical fluids to extract liquid hydrocarbons from coal and other carbonaceous substances such as oil sands and oil shale. A supercritical fluid is a fluid at high temperature and pressure (generally considered to be at or above a "critical temperature" and a "critical pressure") such that the density of the liquid phase is approximately equal to the density of the gaseous phase resulting in conditions wherein the phase boundary between the liquid and a gaseous phases of the aqueous solution ceases to exist such that there is no (or very little) distinction between the two phases. It has recently been shown that supercritical water can be used to successfully extract liquid hydrocarbons from coal, oil sands and oil shale; however, such research has generally been conducted in above ground reactors that are purpose built to withstand the high pressures, high temperatures and highly solvent properties of a supercritical fluid, and such reactors are necessarily expensive.

The present inventor has realised that due to the complexity of coal formations, it is advantageous to liquefy carbonaceous materials such as coal in situ in a coal formation using a two-step process that initially heats the reaction zone and secondly utilises supercritical, superheated or high-velocity superheated fluids to facilitate liquefaction of a carbonaceous substance by a liquefaction reaction that utilises the natural properties of the coal formation.

SUMMARY OF THE INVENTION

In a first aspect, the present invention provides a method of liquefying carbonaceous material in situ to produce liquid hydrocarbon comprising the following steps:
(a) applying a first aqueous solution to the carbonaceous material to facilitate an initial liquefaction reaction in a reaction zone in the carbonaceous material that liquefies the carbonaceous material to liquid hydrocarbon and heats the reaction zone to a desired temperature, wherein the first aqueous solution comprises components selected from the group consisting of water, hydrogen peroxide at a (w/w) concentration range between 0.1% to 70%, a solvent at a (w/w) concentration range between 0.1% to 30%, and a first catalyst; and
(b) applying a second aqueous solution to the reaction zone in the carbonaceous material once the reaction zone reaches the desired temperature, wherein the second aqueous solution facilitates a continuing liquefaction reaction that liquefies the carbonaceous material to produce liquid hydrocarbon, and wherein the second aqueous solution comprises components selected from the group consisting of water, hydrogen peroxide at a (w/w) concentration range between 0.1% to 70%, a solvent at a (w/w) concentration range between 0.1% to 30%, and a second catalyst, and wherein the second aqueous solution is a fluid selected from the group consisting of a heated fluid, a superheated fluid, a supercritical fluid, a high-velocity superheated fluid and a high-velocity supercritical fluid.

In an embodiment, the first aqueous solution comprises hydrogen peroxide at a (w/w) concentration range between 20% and 60%. In one alternative, the first aqueous solution comprises hydrogen peroxide at a (w/w) concentration range between 20% and 40%. In another alternative, the first aqueous solution comprises hydrogen peroxide at a (w/w) concentration range between 40% and 60%.

In an embodiment, the first aqueous solution comprises the solvent, wherein the solvent is methanol at a (w/w) concentration range between 1% and 10%.

In an embodiment, the desired temperature is between 150° C. and 500° C. Preferably, the desired temperature is between 275° C. and 375° C.

In an embodiment, the second aqueous solution comprises hydrogen peroxide at a (w/w) concentration range between 0.1% and 25%.

In an embodiment, the second aqueous solution comprises methanol at a (w/w) concentration range between 1% and 10%.

In a second aspect, the present invention provides a method of liquefying a carbonaceous material to produce liquid hydrocarbons comprising the following steps:
(a) applying a first aqueous solution to a reaction zone in a carbonaceous material to facilitate an initial liquefaction reaction that liquefies the carbonaceous material to liquid hydrocarbon and heats the reaction zone to a desired temperature in the approximate range between 275° C. and 375° C., wherein the first aqueous solution comprises hydrogen peroxide at a (w/w) concentration range between 40% and 60% and optionally a first catalyst; and
(b) applying a second aqueous solution to the reaction zone in the carbonaceous material when the reaction zone reaches the desired temperature, wherein the second aqueous solution facilitates a continuing liquefaction reaction that liquefies the carbonaceous material to produce liquid hydrocarbon, wherein the second aqueous solution comprises components selected from the group consisting of water, hydrogen peroxide at a (w/w) concentration range between 1% and 10%, methanol at a (w/w) concentration range between 2% and 8% and a second catalyst, and wherein the second aqueous solution is a fluid selected from the group consisting of a superheated fluid, a supercritical fluid, a high-velocity superheated fluid and a high-velocity supercritical fluid.

In a third aspect, the present invention provides a method of liquefying a carbonaceous material to produce liquid hydrocarbons comprising the following steps:
(a) applying a first aqueous solution to a reaction zone in a carbonaceous material to facilitate an initial liquefaction reaction that liquefies the carbonaceous material to liquid hydrocarbon and heats the reaction zone to a desired temperature in the approximate range between 275° C. and 375° C., wherein the first aqueous solution comprises hydrogen peroxide at a (w/w) concentration range between 20% and 40% and optionally a first catalyst; and
(b) applying a second aqueous solution to the reaction zone in the carbonaceous material when the reaction zone reaches the desired temperature, wherein the second aqueous solution facilitates a continuing liquefaction reaction that liquefies the carbonaceous material to produce liquid hydrocarbon, wherein the second aqueous solution comprises components selected from the group consisting of water, hydrogen peroxide at a (w/w) concentration range between 1% and 10%, methanol at a (w/w) concentration range between 2% and 8% and a second catalyst, and wherein the second aqueous solution is a fluid selected from the group consisting of a superheated fluid, a supercritical fluid, a high-velocity superheated fluid and a high-velocity supercritical fluid.

In an embodiment of the first, second and third aspects of the invention, the second aqueous solution is pressurised to a pressure between the critical pressure point of methanol and the critical pressure point of water prior to applying of the aqueous solution to the carbonaceous material.

In an embodiment of the first, second and third aspects of the invention, the second aqueous solution is a supercritical fluid or a superheated fluid at high pressure prior to being applied to the carbonaceous material and is depressurised to a lower pressure immediately prior to being applied to the carbonaceous material. Preferably, the second aqueous solution is depressurised to a lower pressure in the approximate range between 0.5 MPa and 10 MPa. More preferably, the second aqueous solution is depressurised to a lower pressure in the approximate range between 0.5 MPa and 2 MPa.

In an embodiment of the first, second and third aspects of the invention, the second aqueous solution is a high-velocity superheated fluid or a high-velocity supercritical fluid, wherein the high-velocity superheated fluid or the high-velocity supercritical fluid is applied to the carbonaceous material at a velocity in the range between 50 m/sec and 450 msec.

In an embodiment, the second aqueous solution is a high-velocity superheated fluid, wherein the high-velocity superheated fluid is a high-velocity superheated fluid with supercritical properties that is obtained by the following steps:
  heating and pressurising an aqueous solution to obtain a superheated fluid or a supercritical fluid; and then,
  passing the superheated or supercritical aqueous solution through a nozzle assembly that facilitates de-pressurising such that the aqueous solution has a pressure in the range approximately between 0.5 MPa and 10 MPa immediately prior to the applying of the aqueous solution to the carbonaceous material and also facilitates the applying of the aqueous solution to the carbonaceous material at a velocity in the range between 50 msec and 450 msec, such that the aqueous solution is a high-velocity superheated fluid that has supercritical properties.

In an alternative embodiment, the second aqueous solution is a high-velocity supercritical fluid, wherein the high-velocity supercritical fluid is a high-velocity unconfined supercritical fluid that is obtained by the following steps:
  heating and pressurising an aqueous solution to obtain a supercritical fluid; and then,
  passing the supercritical aqueous solution through a nozzle assembly that facilitates de-pressurising such that the aqueous solution has a pressure in the range approximately between 0.5 MPa and 10 MPa immediately prior to the applying of the aqueous solution to the carbonaceous material and also facilitates the applying of the aqueous solution to the carbonaceous material at a velocity in the range between 50 m/sec and 450 msec, such that the aqueous solution is a high-velocity unconfined supercritical fluid.

Preferably, the nozzle assembly facilitates de-pressurising such that the aqueous solution has a pressure in the range approximately between 0.5 MPa and 2 MPa immediately prior to the applying of the aqueous solution to the carbonaceous material.

In an embodiment of the first, second and third aspects of the invention, at least one of the first aqueous solution and second aqueous solution comprises hydrogen peroxide, wherein the hydrogen peroxide is provided to the aqueous solution by dissolving into other components of the said aqueous solution substances selected from the group consisting of sodium perborate, sodium percarbonate and sodium perborate monohydrate.

In an embodiment of the first, second and third aspects of the invention, the second aqueous solution is water.

In an embodiment of the first, second and third aspects of the invention, at least one of the first aqueous solution and the second aqueous solution is alkaline.

In an embodiment of the first, second and third aspects of the invention, the first catalyst and the second catalyst are independently selected from the group consisting of iron catalyst, a molybdenum catalyst, an aluminium catalyst, and a borate catalyst, sodium, pyrite, iron oxide, calcium oxide, lime, aluminium oxide, and aluminium filings.

In an embodiment of the first, second and third aspects of the invention, the second aqueous solution and optionally the first aqueous solution is applied to the carbonaceous material continuously and produced liquid hydrocarbons are recovered at the surface continuously.

In an embodiment of the first, second and third aspects of the invention, the method further comprises recovering heat energy produced by the liquefaction reaction using an above-ground heat exchanger, wherein the recovered heat energy at least partially facilitates heating of the at least one of the first aqueous solution and second aqueous solution prior to application of the said aqueous solution to the reaction zone.

In a fourth aspect, the present invention provides a method of liquefying a carbonaceous material in situ to produce liquid hydrocarbons using a high-velocity superheated fluid or a high-velocity supercritical fluid comprising the following steps:
(a) heating and pressurising an aqueous solution to obtain a superheated fluid or a supercritical fluid; and
(b) passing the superheated or supercritical aqueous solution through a nozzle assembly that facilitates de-pressurising in the range approximately between 0.5 MPa and 10 MPa immediately prior to the applying of the aqueous solution to the carbonaceous material and also facilitates the applying of the aqueous solution to the carbonaceous material at a velocity in the range between 50 msec and 450 in/sec, such that the aqueous solution is a high-velocity superheated fluid or a high-velocity supercritical fluid that facilitates liquefaction of the carbonaceous material to produce liquid hydrocarbon,
  wherein the aqueous solution comprises components selected from the group consisting of water, hydrogen peroxide at a (w/w) concentration range between 0.1% and 70%, methanol at a (w/w) concentration range between 0.1% and 30%, and a catalyst.

Preferably, the nozzle assembly facilitates de-pressurising in the range approximately between 0.5 MPa and 2 MPa immediately prior to the applying of the aqueous solution to the carbonaceous material.

In an embodiment, the aqueous solution of step (a) is heated and pressurised to obtain a supercritical fluid, and the aqueous solution of step (b) is a high-velocity superheated fluid with supercritical properties. In an alternative embodiment, the aqueous solution of step (a) is heated and pressurised to obtain a supercritical fluid, and the aqueous solution of step (b) is a high-velocity unconfined supercritical fluid.

In an embodiment, the aqueous solution is applied to the carbonaceous material continuously and produced liquid hydrocarbons are continuously recovered above ground.

In an embodiment, the catalyst is selected from the group consisting of iron catalyst, a molybdenum catalyst, an aluminium catalyst, and a borate catalyst, sodium, pyrite, iron oxide, calcium oxide, lime, aluminium oxide, and aluminium filings.

In an embodiment, hydrogen peroxide is provided to the aqueous solution by dissolving into other components of the said aqueous solution substances selected from the group consisting of sodium perborate, sodium percarbonate and sodium perborate monohydrate.

In an embodiment of the first, second, third and fourth aspects of the invention, further comprising recovering heat energy produced by the liquefaction reaction using an above-ground heat exchanger, wherein the recovered heat energy at least partially facilitates heating of the aqueous solution prior to application of the said aqueous solution to the reaction zone.

In an embodiment of the first, second, third and fourth aspects of the invention, the liquefaction reaction facilitates softening of the carbonaceous material surrounding the reaction zone during the liquefaction reaction, thereby enabling pressure to be applied to the carbonaceous material surrounding the reaction zone without fracturing the said surrounding carbonaceous material. Preferably, the liquefaction reaction is contained to the softened carbonaceous material.

In an embodiment of the first, second, third and fourth aspects of the invention, at least one substance is produced or released due to the liquefaction reaction into the reaction zone that enhances the continuing liquefaction reaction. Preferably, the at least one substance is selected from the group consisting of methanol, hydrogen peroxide, and an entrained impurity in the carbonaceous material.

In an embodiment of the first, second, third and fourth aspects of the invention, water is produced or released due to the liquefaction reaction into the reaction zone, wherein the produced or released water can be recovered.

In an embodiment of the first, second, third and fourth aspects of the invention, the produced liquid hydrocarbon includes at least one heavy liquid hydrocarbon, wherein the at least one heavy liquid hydrocarbon is optionally reapplied to the carbonaceous material for further reaction in the liquefaction reaction.

In an embodiment of the first, second, third and fourth aspects of the invention, the liquefaction reaction occurs in a reaction zone within the carbonaceous material, and the temperature of the reaction zone is regulated.

DETAILED DESCRIPTION

Figure 1:
FIG. 1 provides photographs of the reaction of raw Lock coal with 50% hydrogen peroxide at (A) 2 mins after hydrogen peroxide was added to coal (23.8° C.), (B) 12 mins after hydrogen peroxide was added to coal (66.0° C.), and (C) 13 mins after hydrogen peroxide was added to coal (94° C.)
Figure 1:
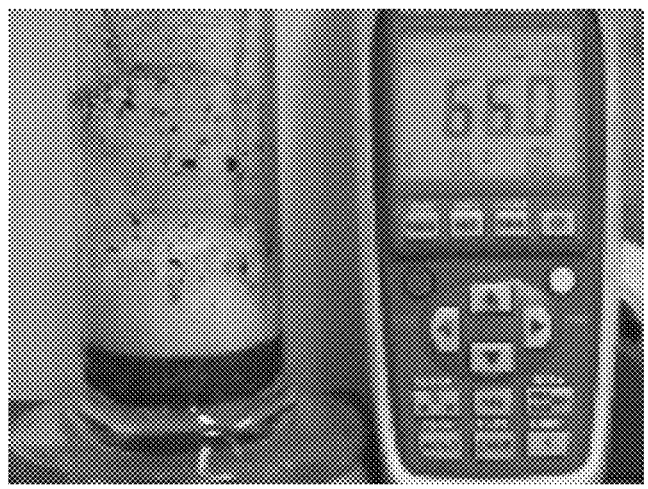
Figure 1:

The present inventor has realised that carbonaceous materials such as coal, oil sands and/or oil shale can be efficiently liquefied in situ using an aqueous solution that is capable of liquefying the carbonaceous material in a reaction zone in situ, by advantageously utilising the natural properties of carbonaceous materials.

For example, the present inventor has realised that the liquefaction reaction may be initiated using "low severity" conditions, that is, applying the aqueous solution under low temperature and low pressure conditions. For example, the liquefaction reaction may be initiated by applying to a carbonaceous material an aqueous solution capable of initiating liquefaction, such as an aqueous solution containing water, hydrogen peroxide and/or an alcohol or solvent such as methanol, and optionally a catalyst, at low pressure and low temperature. Once initiated, the continuing reaction may be enhanced by the increased temperature produced by the reaction within the reaction zone. Such an aqueous solution initiates a liquefaction reaction that is exothermic. Due to the insulative properties of carbonaceous materials in situ, the temperature is raised within the reaction zone as the liquefaction reaction progresses. Once the temperature is raised to a desired temperature, it becomes efficient to switch to a heated aqueous solution, as the heat of the aqueous solution may be retained within the heated reaction zone, and to continue liquefaction using the heated aqueous solution. Preferably, the heated aqueous solution will be heated to high temperatures and simultaneously be pressurised to above atmospheric pressure, for example, to obtain a superheated fluid or supercritical fluid. As the reaction progresses, substances may be released from the carbonaceous material, or produced by reaction, which may enhance the liquefaction process. Such substances may include methanol, hydrogen peroxide, free radicals, catalysts (that were initially ingrained as impurities in the coal), water, hydrogen gas and/or methane gas. The aqueous solution can be applied and the produced liquid hydrocarbons recovered using conventional mining technology. In a particularly preferred embodiment, the aqueous solution is applied using a nozzle assembly that applies the aqueous solution to the face of the carbonaceous material at a high velocity. The nozzle assembly may also optionally or alternatively depressurise the aqueous solution immediately prior to application of the aqueous solution to the face of the carbonaceous material.

Following the initiation of the liquefaction reaction, various by-products may be produced by the reaction or released from the carbonaceous material as it liquefies, for example, free radicals, minerals, organic components, volatiles and water released may act to enhance a continuing liquefaction reaction, wherein that continuing reaction may, in fact, include multiple reaction pathways. The exact reaction pathways taken depend upon the nature of a particular carbonaceous material to be liquefied, including the type of carbonaceous material, and the type and quantity of minerals, volatiles and water embedded within the coal formation. More specifically, mineral catalysts and organic compounds released during the in situ liquefaction reaction will vary depending on the make up of a particular carbonaceous material, which may alter the precise chemical pathways of the liquefaction of the carbonaceous material. Thus, the present inventor has realised that initiating the liquefaction reaction may result in a continuing liquefaction reaction, which may occur via multiple pathways depending upon the constituents of a given coal formation. Such multiple pathways may work together, with the end result being in situ liquefaction of the carbonaceous material to produce liquid hydrocarbon.

The term "carbonaceous material" is intended to refer to refer to an a solid, semi-solid or bituminous organic fossil fuel compound such as coal, including lignite (also known as brown coal), sub-bituminous coal, bituminous coal, anthracite and graphite, as well as oil shale, oil sands (tar sands), heavy or bituminous oil deposits, and other related substances, and combinations thereof.

The term "hydrocarbon" would be understood by a person skilled in the art to refer to an organic compound consisting of hydrogen and carbon.

The term "liquid hydrocarbon" is intended to refer to the hydrocarbons produced by the method of the invention that are suitable for use as a fuel, either directly or following an appropriate treatment, conversion or upgrade using methods well-known to those persons skilled in the cart. The liquid hydrocarbons may also comprise some solid or particulate matter, including oil-soluble solids. The liquid hydrocarbon of present invention may also be referred to as "oil", "coal oil", "unconventional oil", "crude oil" or "crude oil substitute" by persons skilled in the art. The liquid hydrocarbons of the present invention may also comprise soluble organic hydrocarbon solvents, such as methanol, ethanol, etc, in addition to any semi-volatile organic compounds or volatile organic compounds that can be recovered.

The term "in situ" as used herein is intended to limit the carbonaceous material as being in its original location, that is, within a geological deposit of carbonaceous material found naturally in the ground. A person skilled in the art would understand that an in situ deposit of carbonaceous material frequently comprises various forms of carbonaceous materials including oil shale, oil sands (tar sands), heavy or bituminous oil deposits, lignite (also known as brown coal), sub-bituminous coal, bituminous coal through to anthracite and graphite and combinations thereof.

The term "liquefaction reaction" is intended to refer to a chemical reaction wherein a solid, semi-solid or bituminous carbonaceous material is reduced to a less solid or liquid form. The in situ liquefaction reaction may be characterised by substantially simultaneous cleavage and hydrogenation of the carbonaceous material, wherein chemical bonds between two atoms in a molecule (eg double bonds between two carbon atoms in a molecule of a carbonaceous material) are generally reduced by a reaction that binds hydrogen atom(s), such that the two carbon molecules previously double bonded together remain joined by a single bond and one or both are now bonded to a hydrogen (or other) atom. The binding of a hydrogen atom to a carbon atom at a cleaved bond is also referred to as "capping". Alternatively, the bonds between two carbon atoms may be completely cleaved such that the molecule is separated into two distinct molecules at that point. Carbonaceous material is liquefied as it is hydrogenated, meaning that a carbonaceous material changes from a more solid state to a more liquid state, that is, a liquid hydrocarbon. Under experimental conditions, hydrogenation of coal may result in up to 96% of coal being liquefied. Hydrogenation is a strongly exothermic process. The terms "liquefying" or "liquefaction" are also intended to be referring to this process.

The term "reaction zone" is intended to refer to the in situ area in which the liquefaction reaction is occurring.

The term "aqueous solution" is intended to refer to a liquid that is water, or similar to water, or a water-based liquid in which other chemical components are dissolved. However, it will be appreciated that the liquid can be a superheated or supercritical fluid. It is also to be understood that any of the aqueous solutions of the present invention may alternatively comprise components selected from the group consisting of water, hydrogen peroxide, methanol, ethanol, acetone, propane, ethylene, and propylene. The aqueous solution can further comprise an organic component, diesel fuel, or a liquid hydrocarbon.

The term "supercritical fluid" describes a fluid at a temperature and pressure above its thermodynamic critical point; wherein the term "thermodynamic critical point" refers to the conditions (ie temperature and pressure) at which the phase boundary between a liquid and a gaseous phases of the aqueous solution ceases to exist. A person skilled in the art will appreciate that the aqueous solution is a supercritical fluid when at or above a "critical temperature" and a "critical pressure" such that the density of the liquid phase is approximately equal to the density of the gaseous phase with no (or very little) distinction between the two phases. However, many research papers report the use of supercritical fluids when at least one of the parameters is somewhat below the critical point. Accordingly, it will be appreciated by a person skilled in the art that in practical application, a broad range of temperatures and pressures exists at which the fluid behaves as a supercritical fluid, such that the thermodynamic critical point can be thought of as a "supercritical region" consisting of a range of temperatures and pressures at which the fluid behaves as a "supercritical fluid", rather than a distinct point, line or distinct combination of pressure and temperature. Accordingly, a "supercritical fluid" of the present invention is intended to refer to a fluid with temperatures or pressures in or above the supercritical region that behaves like a supercritical fluid.

A "superheated fluid" is a fluid under pressure greater than atmospheric pressure at temperatures between its usual boiling point (ie at atmospheric pressure) and its thermodynamic critical point. For example, superheated water may have a pressure range and temperature range between 100° C. at atmospheric pressure to the point where the fluid is considered to be in the supercritical range. For example, superheated water could have a pressure of 15 MPa and a temperature of 350° C., a pressure of 10 MPa and a temperature of 350° C., a pressure of 0.5 MPa and 10 MPa and a temperature of 150° C. to 350° C., etc. A person skilled in the art will appreciated that superheated fluid can exists in a wide range of pressures and temperatures. Thus, in a first aspect, the present invention provides a method of liquefying carbonaceous material in situ to produce liquid hydrocarbon comprising the following steps:

(a) applying a first aqueous solution to the carbonaceous material to facilitate an initial liquefaction reaction in a reaction zone in the carbonaceous material that liquefies the carbonaceous material to liquid hydrocarbon and heats the reaction zone to a desired temperature, wherein the first aqueous solution comprises components selected from the group consisting of water, hydrogen peroxide at a (w/w) concentration range between 0.1% to 70%, a solvent at a (w/w) concentration range between 0.1% to 30%, and a first catalyst; and (b) applying a second aqueous solution to the reaction zone in the carbonaceous material once the reaction zone reaches the desired temperature, wherein the second aqueous solution facilitates a continuing liquefaction reaction that liquefies the carbonaceous material to produce liquid hydrocarbon, and wherein the second aqueous solution comprises components selected from the group consisting of water, hydrogen peroxide at a (w/w) concentration range between 0.1% to 70%, a solvent at a (w/w) concentration range between 0.1% to 30%, and a second catalyst, and wherein the second aqueous solution is a fluid selected from the group consisting of a heated fluid, a superheated fluid, a supercritical fluid, a high-velocity superheated fluid and a high-velocity supercritical fluid.

It is desirable to initiate a strong exothermic reaction with the first aqueous solution within the carbonaceous material rapidly; however, a very high temperature, such as over 500° C. is undesirable as it may cause thermal cracking of the carbonaceous material as detailed below. Preferably, the desired temperature is between 150° C. and 500° C. More preferably, the desired temperature is between 275° C. and 375° C. For example, the desired temperature may be 300° C., or alternatively, the desired temperature may be 350° C.

Hydrogen peroxide is a strong oxidant, and the present inventor has realised that imitating the liquefaction reaction with hydrogen peroxide may advantageously provide a strong exothermic reaction. Increasing the concentration of the hydrogen peroxide may increase the strength of the liquefaction reaction. The exact concentration of hydrogen peroxide to be used in the aqueous solution can be varied according to the properties of the carbonaceous material being liquefied (eg, whether the carbonaceous materials are mostly high rank coal, low rank coal, oil sands, oil shale etc), and whether the aqueous solution also further comprises other constituents, and the temperature and pressure of the aqueous solution as described in more detail below. Preferably, the first aqueous solution comprises hydrogen peroxide at a (w/w) concentration range between 20% and 40%, for example, approximately 50%. Alternatively, the first aqueous solution may comprise hydrogen peroxide at a (w/w) concentration range between 40% and 60%, for example, approximately 30%.

In any of the aspects of the present invention, hydrogen peroxide can be provided to an aqueous solution by dissolving chemical substances such as sodium perborate, sodium percarbonate and sodium perborate monohydrate in a solvent, such as water, as these substances dissolve in water, producing hydrogen peroxide. Advantageously, dissolving into water said substances overcomes difficulties associated with handling, storing and transporting hydrogen peroxide. Preferably, the substance is sodium perborate, as sodium perborate has excellent solubility in water, dissolving to products including hydrogen peroxide and borate. In an embodiment, the produced borate or carbonate may be used to catalyse the liquefaction reaction. Alternatively, hydrogen peroxide may be directly added to the aqueous solution.

In an embodiment of the invention, the aqueous solution comprises a solvent selected from the list consisting of methanol, ethanol, acetone, ethylene, and propylene. Whilst not wanting to be bound by this theory, it is thought that the presence of even a low concentration of an alcohol (eg methanol) in the reaction zone promotes a range of coal liquefaction processes. Methanol, in the context of the present invention, is a hydrogen donor solvent, and accordingly, facilitates the hydrogenation and hence liquefaction of the carbonaceous material in situ. Preferably, the aqueous solution comprises at a (w/w) concentration range between 0.1% to 30%. More preferably, the first aqueous solution comprises methanol at a (w/w) concentration range between 1% and 10%, for example 2%, or alternatively, 5% or 8%.

In an embodiment, the first aqueous solution comprises hydrogen peroxide and methanol.

It will be appreciated that the second aqueous solution is heated, which will advantageously enhance the liquefaction reaction. Accordingly, the reactants (such as hydrogen peroxide and/or the solvent) can be used in a lower concentration, while still maintaining the strength of the liquefaction reaction. Accordingly, the second aqueous solution may comprise hydrogen peroxide at a (w/w) concentration range between 0.1% and 25%, preferably, the at a (w/w) concentration range between 1% and 10%. Similarly, the second aqueous solution may comprise methanol at a (w/w) concentration range between 1% and 10%, for example, 2% or 8%.

The aqueous solution may be a heated fluid. Typically, a heated fluid would be considered to be a fluid at atmospheric pressure that has been heated to be at or below its boiling point.

However, it is advantageous if an aqueous solution of the invention can facilitate efficient capping of cleaved carbon molecules during the liquefaction reaction, as if a hydrogen atom is not immediately available to cap the cleaved carbon bond, retrograde reaction may occur, where the carbon bonds may become bonded to other molecules that have undergone similar bond cleavage. The resulting rejoined molecules results in a hydrocarbon molecule that is particularly resistant to further hydrogenation or upgrading, which is undesirable.

Accordingly, the second aqueous solution may be a supercritical fluid. Table 1 refers to the critical properties of a number of commonly used supercritical fluids. It can be observed that the critical pressure of water is approximately 22 MPa and the critical temperature of water is approximately 374° C. However, many research papers report the use of supercritical fluids when at least one of the parameters is somewhat below the critical point. Accordingly, it will be appreciated by a person skilled in the art that in practical application, a broad range of temperatures and pressures exists at which the fluid behaves as a supercritical fluid, such that the thermodynamic critical point can be thought of as a "supercritical region" consisting of a range of temperatures and pressures at which the fluid behaves as a "supercritical fluid". Additionally, supercritical water may have much higher temperatures and pressures, for example, a pressure of 25 MPa and a temperature of 430° C., or a pressure of 35 Mpa and a temperature of 450° C. A person skilled in the art will similarly recognise that supercritical water can exist in a wide range of pressures and temperatures

TABLE 1

Critical properties of various solvents

| Solvent | Molecular weight (g/mol) | Critical temperature (° C.) | Critical pressure (MPa (atm)) | Critical density (g/cm3) |
|---|---|---|---|---|
| Carbon dioxide | 44.01 | 31.1 | 7.38 (72.8) | 0.469 |
| Water | 18.02 | 374.3 | 22.12 (218.3) | 0.348 |
| Methane | 16.04 | −82.6 | 4.60 (45.4) | 0.162 |
| Ethane | 30.07 | 32.3 | 4.87 (48.1) | 0.203 |
| Propane | 44.09 | 96.8 | 4.25 (41.9) | 0.217 |
| Ethylene | 28.05 | 9.4 | 5.04 (49.7) | 0.215 |
| Propylene | 42.08 | 91.9 | 4.60 (45.4) | 0.232 |
| Methanol | 32.04 | 239.6 | 8.09 (79.8) | 0.272 |
| Ethanol | 46.07 | 240.9 | 6.14 (60.6) | 0.276 |
| Acetone | 58.08 | 235.1 | 4.70 (46.4) | 0.278 |

Supercritical fluids can advantageously diffuse through solids like a gas, and dissolve materials like a liquid. Accordingly, supercritical fluid has properties that may be advantageously utilised to facilitate liquefaction of the carbonaceous material. A supercritical fluid is a dense phase of highly compact atoms, for example, hydrogen and oxygen atoms, wherein the molecular bonds normally found between these atoms are enormously weakened, such that, for all practical purposes, the bonds can be considered transient or non-existent. For example, the hydrogen bonding in a supercritical fluid is enormously weaker than normally observed in the (normal) liquid phase, which results in the supercritical fluid becoming less polar and behaving more like an organic solvent. Accordingly, the solubility of organic materials (eg coal) and gases is known to increase in a supercritical fluid by several orders of magnitude compared to the same organic materials and gases in the same fluid when in a liquid phase. Accordingly, a supercritical fluid is a powerful organic solvent for a range of industrial uses, and has shown promising results in liquefying carbonaceous material such as coal, oil shale and oil sands in above-ground laboratory experiments.

Supercritical fluids are thought to be highly ionised, for example, up to 70% supercritical water is considered to exist as ions. Molecules such as water molecules present in a supercritical fluid or a superheated fluid may spontaneously dissociate into monatomic and diatomic atoms (eg hydrogen and oxygen atoms), or into ions such as $H_3O^+$ and $OH^-$ ions, or $H^+$ and $OH^-$ ions. Dissociation of molecules in supercritical or superheated fluids may be due to self-ionisation due to weakened hydrogen bonding and may be enhanced by metal catalysis. Further, a supercritical solution containing methanol in water may enhance this effect. It has been calculated that approximately 1 in every 10,000 water molecules is dissociated at any one time.

Whilst not wanting to be bound by this theory, it is thought that 1 in 10,000 molecules are dissociating 1000 times every second, which may explain why supercritical water can act as a powerful base as well as a powerful acid at the same time. However, in order for the water molecules to reform, $H^+$ and $OH^-$ ions have to be in close physical proximity to each other.

Supercritical water is known to be an effective solvent of carbonaceous materials including coal, which may be due to its low viscosity, surface tension and ability to penetrate into micropores. Carbon-carbon (CC) bonds of carbonaceous materials are particularly susceptible to cleavage from $OH^-$ ions (hydroxyl ions), hydroxyl (OH) radicals, or from various other free radicals. Hydroxyl ions, hydroxyl radical and other free radicals can be generated from the mobilisation of the volatile component of the carbonaceous material, for example, from thermal elevation of the carbonaceous material, or alternatively can be supplied by application of substances that contain the radicals. Supercritical water, and to a lesser degree superheated water, are both a source of hydroxyl. Once cleavage of the carbon bonds has occurred the carbon molecules are able to be rapidly "capped" or stabilised by the acceptance of a hydrogen atom at each cleaved bond. Accordingly, both supercritical water, and to a lesser degree superheated water, are able to provide such a hydrogen atom for transfer or capping to the carbonaceous material. The source of such a hydrogen atom from water is typically from a $H_3O$ ion which will resolve back to $H_2O$ after transferring one hydrogen atom, or alternatively, a hydrogen may be provided by a hydrogen ion that has been ionised from its partner hydroxyl ion.

Advantageously, supercritical water has been shown to at least partially liquefy coal in the absence of catalysts. Accordingly, in an embodiment, the present invention provides a method of liquefying the carbonaceous material in situ in a coal formation comprising applying an aqueous solution to the coal formation to produce liquid hydrocarbon by the liquefaction reaction, wherein the aqueous solution is superheated water or supercritical water. The critical temperature of water is 374° C., and its critical pressure is 22 MPa; however it can also exist in much higher temperatures and pressures. Water can be heated and pressurised to form a superheated fluid or a supercritical fluid using any method known to persons skilled in the art. Preferred methods are described below.

Whilst not wanting to be bound by this theory, it is likely that the liquefaction of the carbonaceous material with a supercritical fluid will utilise a technique known as rapid expansion of supercritical solutions (RESS). RESS is a method for producing nanoparticles. It is thought that the method of the present invention may utilise RESS such that nanoparticle-sized catalysts are delivered at high velocity directly to the surface of the face of the coal formation, further providing large surface contact area by the velocity of the solution and also large surface contact area with the entrained nanoparticle sized catalysts. Further, whilst not wanting to be bound by this theory, the liquefaction reaction of the present invention may produce various free radicals, which facilitate the bond cleavage required to liquefy the carbonaceous material. The radicals can then be bound (or "capped") with hydrogen to stabilise the produce liquid hydrocarbon at room temperatures. Thus, free radicals are produced during the thermal mobilisation of the volatile component of a carbonaceous material and result in the further cleavage of bonds enhancing the liquefaction of the carbonaceous material.

The second aqueous solution may be a superheated fluid. A superheated fluid also has solvent-like properties that may be advantageously utilised to facilitate liquefaction of the carbonaceous material. For example, hydrogen bonding in a superheated fluid is weaker than normally in the fluid (ie in the liquid phase), which results in the superheated fluid becoming less polar and behaving more like an organic solvent. Superheated water is generally considered to contain up to 100 times the water ions (such as $H_3O^+$ and $OH^-$ ions, or $H^+$ and $OH^-$ ions) than are found in ambient water.

Accordingly, the solubility of carbonaceous materials (eg coal) and gases is known to increase in a superheated fluid by several orders of magnitude compared to the same carbonaceous materials and gases in the same fluid when in a liquid phase. A person skilled in the art will appreciate that the higher the temperature and pressure of the superheated fluid, the stronger the solvent-like properties of the fluid, that is, the more supercritical-like the properties become.

The aqueous solution can be heated and pressurised to form a superheated fluid or a supercritical fluid using any method known to persons skilled in the art. Preferred methods are described below.

It is thought that an initial reaction that heats the reaction zone to a desired temperature in the approximate range between 275° C. and 375° C. is particularly suitable for liquefying carbonaceous materials. A first aqueous solution comprising hydrogen peroxide at a (w/w) concentration range between 40% and 60% and optionally a first catalyst may advantageously promote a liquefaction reaction that attains this temperature.

Accordingly, in a second aspect, the present invention provides a method of liquefying a carbonaceous material to produce liquid hydrocarbons comprising the following steps:
(a) applying a first aqueous solution to a reaction zone in a carbonaceous material to facilitate an initial liquefaction reaction that liquefies the carbonaceous material to liquid hydrocarbon and heats the reaction zone to a desired temperature in the approximate range between 275° C. and 375° C., wherein the first aqueous solution comprises hydrogen peroxide at a (w/w) concentration range between 40% and 60% and optionally a first catalyst; and
(b) applying a second aqueous solution to the reaction zone in the carbonaceous material when the reaction zone reaches the desired temperature, wherein the second aqueous solution facilitates a continuing liquefaction reaction that liquefies the carbonaceous material to produce liquid hydrocarbon, wherein the second aqueous solution comprises components selected from the group consisting of water, hydrogen peroxide at a (w/w) concentration range between 1% and 10%, methanol at a (w/w) concentration range between 2% and 8% and a second catalyst, and wherein the second aqueous solution is a fluid selected from the group consisting of a superheated fluid, a supercritical fluid, a high-velocity superheated fluid and a high-velocity supercritical fluid.

Further, a first aqueous solution comprising hydrogen peroxide at a (w/w) concentration range between 20% and 40% and optionally a first catalyst may be suitable for certain carbonaceous materials to advantageously promote a liquefaction reaction that attains this temperature.

Accordingly, in a third aspect, the present invention provides a method of liquefying a carbonaceous material to produce liquid hydrocarbons comprising the following steps:
(a) applying a first aqueous solution to a reaction zone in a carbonaceous material to facilitate an initial liquefaction reaction that liquefies the carbonaceous material to liquid hydrocarbon and heats the reaction zone to a desired temperature in the approximate range between 275° C. and 375° C., wherein the first aqueous solution comprises hydrogen peroxide at a (w/w) concentration range between 20% and 40% and optionally a first catalyst; and
(b) applying a second aqueous solution to the reaction zone in the carbonaceous material when the reaction zone reaches the desired temperature, wherein the second aqueous solution facilitates a continuing liquefaction reaction that liquefies the carbonaceous material to produce liquid hydrocarbon, wherein the second aqueous solution comprises components selected from the group consisting of water, hydrogen peroxide at a (w/w) concentration range between 1% and 10%, methanol at a (w/w) concentration range between 2% and 8% and a second catalyst, and wherein the second aqueous solution is a fluid selected from the group consisting of a superheated fluid, a supercritical fluid, a high-velocity superheated fluid and a high-velocity supercritical fluid.

Methanol is advantageous in an aqueous solution of the present invention as varying the concentration of methanol varies the dielectric constant of the aqueous solution when the aqueous solution is a supercritical fluid. Additionally, methanol is at a supercritical point at lower pressures and temperatures than water.

Accordingly, in an embodiment of the first, second and third aspects of the invention, the second aqueous solution is pressurised to a pressure between the critical pressure point of methanol and the critical pressure point of water prior to applying of the aqueous solution to the carbonaceous material. For example, the second aqueous solution may be pressurised to a pressure range approximately between 8 MPa and 22 MPa. Supercritical methanol is useful for liquefying low-rank coal in above-ground laboratory experiments. Further, methanol is water soluble and enhances the supercritical properties of water. Solvents such as methanol become supercritical fluids at lower critical pressures and lower critical temperatures compared to water. It is advantageous to utilise an aqueous solution comprising methanol at a pressure that is between the critical pressure of methanol and the critical pressure of water, particularly if the temperature of the aqueous solution is above the critical temperature of methanol. It is thought that the methanol molecules will possess at least some supercritical properties whilst in a non-supercritical fluid at the said pressure.

In some embodiments, a fluid pressure at approximately 8 MPa (for example, at a range including 8 to 10 MPa) is preferred, which is below the fracture pressure of coal. Methods of applying pressure to the coal formation are described below. In an embodiment of the invention, the temperature of the reaction zone is likely to be sufficient for such molecules to also be at or near critical temperature. Accordingly, in an embodiment of the invention, a range of solvents are in contact with the carbonaceous material in the reaction zone in a supercritical state or a superheated state, enhancing hydrogenation and accordingly liquefaction of the carbonaceous material.

Alternatively, the second aqueous solution may be a supercritical fluid or a superheated fluid at high pressure prior to being applied to the carbonaceous material and be depressurised to a lower pressure immediately prior to being applied to the carbonaceous material. Depressurising the aqueous solution may advantageously enable large cost savings in plant and equipment required and/or enable flexibility in process design. Further, the lower pressure may ensure that the contact of the aqueous solution does not exceed the fracture pressure of the carbonaceous material. The depressurisation may be facilitated by any means known to those skilled in the art. Preferred methods of applying the aqueous solution to the carbonaceous material, including depressurising the aqueous solution immediately prior to application to the carbonaceous material are described below. However, a preferred embodiment utilises a nozzle assembly as described in Prophetic Example 12 or 14, and also described in co-pending PCT Application titled "Apparatus for Liquefaction of Carbonaceous Materials" by the present inventor.

The superheated fluid at high pressure may be at any desired pressure, providing that it is depressurised to a lower pressure. The second aqueous solution may, for example, be pressurised to 5 to 35 Mpa and then depressurised to approximately 1 to 10 MPa as it passes through the nozzle assembly. Preferably, the second aqueous solution is depressurised to a lower pressure in the approximate range between 0.5 MPa and 5 MPa. More preferably, the second aqueous solution is depressurised to a lower pressure in the approximate range between 0.5 MPa and 2 MPa.

The present inventor has realised that the rapid depressurisation of the aqueous solution may increase the velocity of the aqueous solution as it is depressurised, for example, as it passes through the nozzle assembly. Additionally, or alternatively, the applying apparatus may be capable of applying the aqueous solution at high velocity. The present inventor has realised that if a fluid that is capable of liquefying carbonaceous material is applied to the "face" of the carbonaceous material at high velocity (eg between 50 m/sec to 450 m/sec), the aqueous solution will advantageously impact the face of the carbonaceous material with a large force. The kinetic energy of the velocity is changed to kinetic energy of the fluid at impact with the face of the carbonaceous material, which can advantageously provide additional energy to the fluid at the moment of impact with the carbonaceous material, which may, for example, act to more highly ionise the fluid and accordingly enhance the liquefaction reaction. It is thought when the aqueous solution is being applied to the face of the coal formation at high velocity, ions will diverge which may decrease the rate of water molecules re-forming, enhancing hydrogenation and accordingly liquefaction of carbonaceous material.

As such, the present inventor has realised that the properties of a superheated or a supercritical fluid may be retained for a period of time after the supercritical fluid is depressurised through a nozzle assembly and undergoes a subsequent associated increase in velocity. The present inventor has also realized that the impact of a superheated fluid at high velocity may result in a high-velocity superheated fluid having properties that are more supercritical-like. For example, the impact force of the aqueous solution due to the high velocity may enhance the supercritical-like properties of a superheated fluid which is at a pressure lower than the super critical pressure point. Accordingly, the aqueous solution can be a high-velocity superheated fluid, or alternatively, a high-velocity supercritical fluid.

Preferably, the second aqueous solution is a high-velocity superheated fluid or a high-velocity supercritical fluid, wherein the high-velocity superheated fluid or a high-velocity supercritical fluid is applied to the carbonaceous material at a velocity in the range between 50 m/sec and 450 m/sec. Preferably, the high-velocity superheated fluid or a high-velocity supercritical fluid is applied to the carbonaceous material at a velocity in the range between 50 m/sec and 250 m/sec. More preferably, the high-velocity superheated fluid or a high-velocity supercritical fluid is applied to the carbonaceous material at a velocity of approximately 200 m/sec.

It is also thought that when a supercritical fluid is depressurised, it momentarily retains at least some of the properties of a supercritical fluid. This phenomenon is referred to as the "supercritical lag effect". For example, it has previously been shown by Mignot et al. (2004) that when a supercritical fluid is released through an uninterrupted tube, the supercritical fluid takes approximately 200 seconds to depressurise to atmospheric pressure (0 MPa). The temperature of the supercritical fluid decreased by approximately 100° C. during this 200 sec period under the experimental conditions tested. Accordingly, the critical temperature and critical pressure is transiently retained by the fluid.

The present inventor has realised that a fluid that has been at, or near, its supercritical point (eg. temperature of approximately 370° C. and a pressure of, for example, between 35 MPa and 22 MPa for water), which is then rapidly depressurised to, for example, 1.8 MPa, transiently retains at least some of its supercritical properties, such as enhanced diffusion and dissociated properties of the supercritical fluid, which advantageously aids liquefaction of the carbonaceous material in the reaction zone, for a brief duration of time. Preferably, the properties of a supercritical fluid are transiently retained for a number of seconds (for example, 1 to 10 seconds, preferably 2 seconds) upon depressurisation of a supercritical fluid. Alternatively, the rapid depressurisation may occur over 0.1 to 100 msec, preferably 1 to 10 msec, more preferably approximately 5 msec, and the brief period of time in which the supercritical lag effect occurs is approximately 1 msec to 2 sec. Whilst not wanting to be bound by this theory, the supercritical lag effect may be due to the powerful motion of molecules in the fluid near the critical point. Rapidly depressurised aqueous fluid may advantageously be energised with high levels of kinetic energy in the form of increased velocity or "activation" energy, in addition to having the benefits of supercritical lag properties.

Thus, the aqueous solution of the first, second and third aspects may be heated to be become a supercritical fluid and then be passed through a suitable nozzle assembly that facilitates depressurising of the solution immediately prior to the application and additionally facilitates high-velocity delivery of the aqueous solution. The present inventor has realised that such a high-velocity superheated fluid will have retained supercritical properties for a number of seconds. Further, as the high-velocity fluid is travelling at a velocity between 50 msec and 450 m/sec, these properties will advantageously be retained for a sufficiently long enough time to impact the face of the carbonaceous material formation that may be up to 500 m away, preferably 1 to 200 m away. Such a fluid with retained supercritical properties will advantageously have at least some of the enhanced liquefaction abilities of a supercritical fluid upon impact of the aqueous solution with the face of the carbonaceous material, and is termed a "high-velocity superheated fluid with supercritical properties" herein.

In an embodiment, the high velocity of the fluid may facilitate the depressurised fluid remaining in a liquid phase rather than a gaseous phase. Essentially, the present inventor has realised that the velocity acquired by the supercritical fluid as it is discharged from the nozzle assembly enables the fluid to exist as a liquid or at least liquid droplets even though the surrounding temperature and lower pressure would ordinarily otherwise dictate that the liquid would vaporise. This condition of a supercritical high velocity liquid existing in an environment of lower temperature and pressure will continue until the velocity depletes to a lower velocity at which point the supercritical liquid will become sub-critical and vaporise. In the present method, this condition is retained until impact of the fluid with the face of the carbonaceous material. Any of the high-velocity supercritical fluid which has not been employed in the liquefaction reaction with the carbonaceous material will vaporise into what is essentially steam immediately following impact. Any entrained moisture content of the carbonaceous material or surrounding geological formation will similarly vaporise into steam, partly driven by exposure to the high-velocity supercritical water and its temperature, partly due to the heat generated by the exothermic hydrogenation reactions and heat generated from exothermic liquefaction reactions, and also by the activation energy imparted to molecules from the transfer of the kinetic energy of velocity into internal activation energy of molecules upon the impact of the high-velocity supercritical fluid and the stationary carbonaceous material. Because there is currently no recognised description of a supercritical fluid existing outside of the pressure of confinement, a new phrase has been used by the inventor to describe this new discovery, that is, "water with supercritical properties" (WSP). WSP may be considered to be a fluid at supercritical temperature (eg over 374° C. for water) which retains the properties of supercriticality without confinement and at a lower pressure and high velocity. WSP is referred to as a "high-velocity unconfined supercritical fluid" herein.

Accordingly, the aqueous solution can be applied as a high-velocity superheated fluid with supercritical properties. Preferably, the second aqueous solution is a high-velocity superheated fluid, wherein the high-velocity superheated fluid is a fluid with supercritical properties that is obtained by the following steps:

heating and pressurising an aqueous solution to obtain a superheated fluid or a supercritical fluid; and then, passing the superheated or supercritical aqueous solution through a nozzle assembly that facilitates de-pressurising such that the aqueous solution has a pressure in the range approximately between 0.5 MPa and 10 MPa immediately prior to the applying of the aqueous solution to the carbonaceous material and also facilitates the applying of the aqueous solution to the carbonaceous material at a velocity in the range between 50 m/sec and 450 m/sec, such that the aqueous solution is a high-velocity superheated fluid with supercritical properties.

In an alternative embodiment, the second aqueous solution is a high-velocity supercritical fluid, wherein the high-velocity supercritical fluid is a high-velocity unconfined supercritical fluid that is obtained by the following steps:

heating and pressurising an aqueous solution to obtain a a supercritical fluid; and then, passing the supercritical aqueous solution through a nozzle assembly that facilitates de-pressurising such that the aqueous solution has a pressure in the range approximately between 0.5 MPa and 10 MPa immediately prior to the applying of the aqueous solution to the carbonaceous material and also facilitates the applying of the aqueous solution to the carbonaceous material at a velocity in the range between 50 m/sec and 450 m/sec, such that the aqueous solution is a high-velocity unconfined supercritical fluid.

Preferably, the high-velocity superheated fluid or a high-velocity supercritical fluid is applied to the carbonaceous material at a velocity in the range between 50 m/sec and 250 m/sec. More preferably, the high-velocity superheated fluid or a high-velocity supercritical fluid is applied to the carbonaceous material at a velocity of approximately 200 m/sec.

The nozzle assembly may be any nozzle assembly known to a person skilled in the art. That is capable of depressurising the aqueous solution and applying it to the carbonaceous material at the desired velocity. For example, the nozzle assembly may be a suitable orifice or restrictive assembly. Preferably, the nozzle assembly is as described in Prophetic Example 12 or 14, and also described in co-pending PCT Application titled "Apparatus for Liquefaction of Carbonaceous Materials" by the present inventor, which teaches an apparatus for the liquefaction of carbonaceous materials using the method of the present invention or an alternative method, the teaching of which is incorporated herein in its entirety.

The aqueous solution may alternatively be applied and depressurised by the jet pumping apparatus and jet pumping nozzle assembly or the "modified jet pumping means" described in Prophetic Example 10. Preferably, the nozzle assembly facilitates de-pressurising such that the aqueous solution has a pressure in the range approximately between 0.5 MPa and 2 MPa immediately prior to the applying of the aqueous solution to the carbonaceous material.

As described above, supercritical water is known to effectively liquefy carbonaceous material such as coal and oil sands in above ground reactors. Further, "near supercritical" or "sub-supercritical" water has been shown to liquefy carbonaceous materials such as coal and oil shales in above ground reactors. Accordingly, high-velocity superheated water, including high-velocity superheated water with supercritical properties may also have carbonaceous material liquefying properties. Therefore, in an embodiment of the first, second and third aspects of the invention, the second aqueous solution is water.

Heating the reaction zone using a first aqueous solution, prior to using a second aqueous solution that is a supercritical fluid, a superheated fluid, or a superheated fluid with high velocity or a supercritical fluid with high velocity, is advantageous as the atmosphere in the reaction zone becomes less diffuse as the temperature of the reaction zone rises, for example, to approximately 350° C. Accordingly, the viscosity of the atmosphere in the reaction zone becomes very low, at 350 degC the viscosity is reduced to about 0.1% of that at ambient temperature. This low viscosity environment allows the de-pressurised superheated or supercritical fluid of the second aqueous solution to travel virtually unimpeded through the atmosphere of the reaction zone from the nozzle to contact with the carbonaceous material.

However, a person skilled in the art will appreciate that it is not necessary to heat the reaction zone using an initial liquefaction reaction described above prior to applying an aqueous solution that is a superheated fluid with high velocity or a supercritical fluid with high velocity. For example, the reaction zone may be pre-heated by any means known to those skilled in the art. Alternatively, it is possible to apply the heated (including superheated or supercritical) aqueous solution without first heating the reaction zone, as the application of the heated (including superheated or supercritical) aqueous solution may also heat the reaction zone, although this may be less efficient.

Accordingly, in a fourth aspect, the present invention provides a method of liquefying a carbonaceous material in situ to produce liquid hydrocarbons using a high-velocity superheated fluid comprising the following steps:

(a) heating and pressurising an aqueous solution to obtain a superheated fluid or a supercritical fluid; and (b) passing the superheated or supercritical aqueous solution through a nozzle assembly that facilitates de-pressurising in the range approximately between 0.5 MPa and 10 MPa immediately prior to the applying of the aqueous solution to the carbonaceous material and also facilitates the applying of the aqueous solution to the carbonaceous material at a velocity in the range between 50 msec and 450 msec, such that the aqueous solution is a high-velocity superheated fluid or a high-velocity supercritical fluid that facilitates liquefaction of the carbonaceous material to produce liquid hydrocarbon, wherein the aqueous solution comprises components selected from the group consisting of water, hydrogen peroxide at a (w/w) concentration range between 0.1% and 70%, methanol at a (w/w) concentration range between 0.1% and 30%, and a catalyst.

In an embodiment, the aqueous solution may be a supercritical fluid or a superheated fluid at high pressure prior to being applied to the carbonaceous material and be depressurised to a lower pressure immediately prior to being applied to the carbonaceous material. The superheated fluid at high pressure may be at any desired pressure, providing that it is depressurised to a lower pressure. The aqueous solution may, for example, be pressurised to 5 to 22 Mpa and then depressurised to approximately 1 to 10 MPa as it passes through the nozzle assembly. Preferably, the aqueous solution is depressurised to a lower pressure in the approximate range between 0.5 MPa and 5 MPa. More preferably, the nozzle assembly facilitates de-pressurising in the range approximately between 0.5 MPa and 2 MPa immediately prior to the applying of the aqueous solution to the carbonaceous material.

Preferably, the aqueous solution of step (a) is heated and pressurised to obtain a supercritical fluid, and the high-velocity superheated fluid of step (b) has supercritical properties as described above. In an alternative embodiment, the aqueous solution of step (a) is heated and pressurised to obtain a supercritical fluid, and the aqueous solution of step (b) is a high-velocity unconfined supercritical fluid.

In an embodiment of the first, second, third or fourth aspect of the invention, the liquefaction reaction may be enhanced by the presence of at least one catalyst in an aqueous solution of the present invention for catalysing the liquefaction reaction. The at least one catalyst may be any catalyst known by persons skilled in the art to catalyse the liquefaction of a carbonaceous material. In an embodiment, the catalyst is selected from the group consisting of iron catalyst, a molybdenum catalyst, an aluminium catalyst, and a borate catalyst, sodium, pyrite, iron oxide, calcium oxide, lime, aluminium oxide, and aluminium filings.

An aqueous solution of the present invention may be heated by any suitable method known to those skilled in the art. For example, the aqueous solution may be heated by an above ground boiler or heater. A person skilled in the art will appreciate that the aqueous solution may need to be pressurised to attain superheated or supercritical temperatures.

The pressurising and/or applying of an aqueous solution at high pressure can be facilitated by a suitable high-pressure pump, providing the pump is capable of pressurising the aqueous solution to the desired pressure. In some embodiments, the pump will need to be able to pressurise the aqueous solution to a desired pressure between 5 MPa and 35 MPa.

An aqueous solution of the present invention may be applied to the carbonaceous material by any means known to those skilled in the art. For example, the application may be facilitated by any suitable conventional mining apparatus that is capable of suitable pressurising, and where appropriate, heating the aqueous solution. In embodiments wherein the aqueous solution is being depressurised immediately prior to application of the carbonaceous material, the applying must involve apparatus that are capable of depressurising the aqueous solution in the desired manner. However, preferably, the aqueous solution may be applied to the carbonaceous material by a carbonaceous material liquefaction apparatus, for example, as described in Prophetic Example 12 or 14, and also described in co-pending PCT Application titled "Apparatus for Liquefaction of Carbonaceous Materials" by the present inventor, which teaches an apparatus for the liquefaction of carbonaceous materials using the method of the present invention or an alternative method, the teaching of which is incorporated herein in its entirety. The aqueous solution may alternatively be applied and depressurised by the jet pumping apparatus and jet pumping nozzle assembly or the "modified jet pumping means" described in Prophetic Example 10.

The nozzle assembly provides a means for applying the aqueous solution to the face of the coal formation at a velocity up to 450 m/sec, up to distances of approximately 200 m from the nozzle.

In some embodiments, the nozzle assembly is able to simultaneously de-pressurise the fluid from high pressure to a lower pressure.

Preferably, the apparatus for delivering the aqueous solution to the carbonaceous material also facilitates recovering of the produced liquid hydrocarbon.

Preferably, the method of any of the aspects of the present invention is a continuous process, wherein an aqueous solution of the present invention may be applied to the carbonaceous material continuously and produced liquid hydrocarbons are continuously recovered above ground.

Continuous application of an aqueous solution and continuous recovery of produced liquid hydrocarbons may be facilitated by any suitable method incorporating any suitable apparatus to those persons skilled in the art. For example, the aqueous solution may be applied to the carbonaceous material using conventional mining apparatus and methods, and produced liquid hydrocarbons may be recovered using convention mining apparatus and methods providing the apparatus and method is capable continuous application and recovery.

The recovered liquid hydrocarbon may include heavy liquid hydrocarbons, wherein the heavy liquid hydrocarbons are optionally reapplied to the coal formation for further reaction in the liquefaction reaction. The liquid hydrocarbon characteristics can be varied by recycling already produced liquid hydrocarbon back into the reaction zone to undergo a further liquefaction process. In an embodiment of the invention, the produced liquid hydrocarbon includes at least one heavy liquid hydrocarbon, wherein the at least one heavy liquid hydrocarbon is optionally reapplied to the carbonaceous material for further reaction in the liquefaction reaction.

The liquefaction reaction is an exothermic reaction, and accordingly, heat energy is produced by the liquefaction reaction. Thus, by applying an aqueous solution to the carbonaceous material, the liquefaction reaction, raises the temperature within the reaction zone. The temperature within the reaction zone may be increased by varying the components of the aqueous solution. For example, it is thought that increasing the percentage of hydrogen peroxide in the aqueous solution will promote a stronger liquefaction reaction, which will promote a higher temperature in the reaction zone. An elevated temperature can enhance the rate of liquefaction. Temperatures above 130° C. are understood to induce changes in the chemical structure of the hydro-aromatic compounds of the carbonaceous material, for example, by hydrogenation, promoting liquefaction. It is also thought that the aromatic chemical structure of coal molecules undergo liquefaction via hydrogenolysis. The term "hydrogenolysis" would be understood by a person skilled in the art to refer to a chemical reaction wherein a chemical bond between a carbon atom and a heterogenous atom (eg a hydrogen, sulphur, nitrogen or another atom) is broken by a reaction that binds hydrogen atom(s).

The temperature of the reaction zone may reach between 200° C. and 600° C. An elevated temperature (eg 200° C. to 500° C.) promotes the continuing liquefaction reaction process. In an embodiment, the produced heat energy at least partially facilitates heating of the aqueous solution. In an embodiment, the produced heat energy at least partially facilitates heating of an aqueous solution of the present invention to a superheated temperature or a supercritical temperature.

In an embodiment, the method of the present invention further comprising recovering heat energy produced by the liquefaction reaction using an above-ground heat exchanger. Preferably, the recovered heat energy at least partially facilitates heating of an aqueous solution of the present invention prior to application of the said aqueous solution to the reaction zone via the heat exchanger. Alternatively or additionally, the aqueous solution may be heated, or heat may be maintained, as it passes through the reaction zone, wherein the reaction zone is at a raised temperature due to the exothermic nature of liquefaction reaction.

However, it is possible that a threshold temperature is reached, at which point, retrograde reactions decrease the efficiency of the liquefaction reaction. Thus, liquefying the carbonaceous material above temperature of 500° C., and particularly above 550° C. may not be optimal. It is likely that the natural organic aldehydes, and carboxylic groups, esters and solvents that can exist naturally within coal formations that may enhance the liquefaction process, are destroyed at these temperatures. Preferably, the in situ liquefaction reaction process occurs below 500° C.

Accordingly, the temperature of the reaction zone may be regulated. Temperature regulation may occur in any way known to those skilled in the art. For example, the temperature of the reaction zone may be regulated by recovering heat energy at the surface. Alternatively, the rate of the liquefaction reaction may be modified, which will in turn modify the temperature of the reaction zone. The rate of the liquefaction reaction may be regulated by any means known to those skilled in the art. For example, the rate of the liquefaction reaction may be regulated by modifying the amount, temperature or velocity of aqueous solution as it is applied to the reaction zone. For example, decreasing the temperature of the aqueous solution is likely to decrease temperature directly, as well as indirectly, by slowing the reaction rate. Decreasing the velocity of the applying of the aqueous solution may decrease the amount of reagents and kinetic energy of the liquefaction reaction, decreasing the reaction rate, and hence the temperature of the reaction zone. Alternatively, decreasing the velocity of the applying of the aqueous solution may increase the temperature in the reaction zone due to a reduction in transfer of heat energy to the aqueous solution. The rate of the reaction, and hence the temperature, may be reduced by limiting or reducing the amount of hydrogen peroxide or methanol applied to or produced in the reaction zone, or lowering the pH of the solution. Alternatively the reaction rate may be reduced by the addition of phosphonates or ethylenediaminetetraacetic acid (EDTA). Additionally, temperature can be modified by the addition of catalyst such as trace metals to the aqueous solution, for example, the addition of magnesium dioxide will generate additional heat. In an embodiment, the temperature of the reaction zone is regulated to be at approximately 350° C. to 400° C. Modifying the temperature of the liquefaction reaction to be at approximately 350° C. to 400° C. may advantageously minimise the amount of methane gas that is produced during the reaction, yet permit supercritical temperatures.

A number of substances may be produced or released into the reaction zone during the liquefaction reaction. For example, methanol may be created during the liquefaction reaction by conversion from produced methane gas. The present inventor has realised that the liquefaction reaction establishes conditions in the reaction zone that may facilitate the production of small quantities of methane gas in the reaction zone, and further, that in the reaction zone, the conditions established by the liquefaction reaction are suitable for oxidising methane to methanol within the reaction zone. In an embodiment of the invention, the produced methanol facilitates the continuing liquefaction reaction. Additional methane may be pumped into the reaction zone from the surface, and this methane may be converted to methanol during the liquefaction reaction.

Hydrogen peroxide may be produced during the liquefaction reaction by conversion from produced hydrogen gas combined with oxygen. The present inventor has realised that the liquefaction reaction establishes conditions in the reaction zone that may facilitate the production of small quantities of hydrogen peroxide in the reaction zone.

Additionally, substances released from the carbonaceous material during the liquefaction process, such as catalysts, soluble carboxylic acids and organosulfuric acids may promote hydrogen peroxide formation. In an embodiment of the invention, the produced hydrogen peroxide facilitates the continuing in situ coal liquefaction reaction process. Additional hydrogen and/or oxygen may be pumped into the reaction zone from the surface, and this may be converted to hydrogen peroxide during the liquefaction reaction.

The carbonaceous material may contain entrained mineralised impurities which are released during the liquefaction reaction. The liquefaction of the carbonaceous material can be catalysed by components released from the carbonaceous material, and this may be dependent upon the make up of the particular carbonaceous material. For example, sulphur rich coals contain iron disulfide ($Fe^{2+}$) in the form of pyrite. Pyrite may spontaneously induce the production of hydrogen peroxide in the presence of water. Pyrite is thought to catalyse the formation of hydrogen peroxide through the iron catalysed Haber-Weiss reactions. The hydrogen peroxide can then react with the ferrous iron dissolved from pyrite or at the pyrite surface to form hydroxyl radicals via the Fenton reaction. The mineralised impurities in coal formations may include, for example, pyrene, pyrite, pyridine, gallium, aluminium, gold, as well as other rare earth metals, base transition metals, alkali earth metals and alkali earth non-metals. Gallium and/or pyrite are particularly useful in catalysing the liquefaction reaction.

The carbonaceous material may contain organic components that are released during the liquefaction reaction that may also catalyse or otherwise enhance liquefaction of the carbonaceous material. Accordingly, the application of "parent solvents" found in the aqueous solution (ie the components of the aqueous solution that are capable of liquefying the carbonaceous material) may result in the production of a number of "child solvents" (ie components produced during the liquefaction of the carbonaceous material that are also capable of liquefying the carbonaceous material) in the reaction zone, including ethanol, propanol, acetone natural organic aldehydes, and carboxylic groups, esters, quinones and ketones. For example, the coal formation may contain quinones, which are an organic oxidant. Quinones may be activated to produce hydrogen peroxide by contact with water and by the interaction of solvents. Quinones can act as hydrogen transfer catalysts in the carbonaceous material liquefaction processes. Quinones accelerate the transfer of hydrogen to stabilize the free radicals formed by the disintegrating coal molecules, resulting in higher liquid yield. Accordingly, the liquefaction of the carbonaceous material may be catalysed by organic compounds entrained within the coal formation. Child solvents may have comparatively low critical points (ie compared to water), and accordingly can potentially enter a supercritical state at lower pressures and/or pressures, enhancing liquefaction.

Advantageously, the release of organic components from the carbonaceous material into the reaction zone may have enhanced surfactant action. For example, the fluids in the reaction zone may become entrained with several sub-moieties of break down products facilitated by the contact of the carbonaceous material with hydrogen peroxide in the continuing reaction solution. Certain sub-moieties (for example, ketones) may enhance surfactant properties to the solution. The enhanced surfactant properties may enhance recovery of the liquid hydrocarbon to surface, for example, by facilitating separation of liquid hydrocarbon from oil sand solids and coal solids.

Accordingly, in an embodiment of the invention, at least one substance is produced or released due to the liquefaction reaction into the reaction zone that enhances the continuing liquefaction reaction. Preferably, the at least one substance is selected from the group consisting of methanol, free radicals, hydrogen peroxide and an entrained impurity in the carbonaceous material.

Carbonaceous material contains varying percentages of entrained water within their structure. The liquefaction reaction may release water entrained within the carbonaceous material into the reaction zone. It is likely that water and/or steam are also produced in situ during the liquefaction of carbonaceous material. The said water and/or steam may be utilised during the liquefaction reaction process can optionally be recovered at the surface. Accordingly, in an embodiment of the present invention, water is produced or released due to the liquefaction reaction into the reaction zone, wherein the produced or released water can be recovered. The water may be recovered using any method known to those skilled in the art.

Gases (for example, hydrogen, methane, etc) may be produced as by-products of the liquefaction reaction. In an embodiment, the liquefaction reaction produces gases selected from the group consisting of methane and hydrogen gases, which can be recovered at the surface by a separating means. The separating means may be any separating means known to those skilled in the art. In an embodiment, methane gas is converted to methanol in the reaction zone, or it may alternatively be converted to methanol above ground. Preferably, methane gas is produced and recovered at the surface and reapplied to the carbonaceous material to enhance the liquefaction reaction, or converted to methanol and reapplied to the carbonaceous material to enhance the liquefaction reaction. In an embodiment, hydrogen gas is converted to hydrogen peroxide in the reaction zone, or it may alternatively be converted to hydrogen peroxide above ground. Preferably, hydrogen gas is produced and recovered at the surface and reapplied to the carbonaceous material to enhance the liquefaction reaction, or converted to hydrogen peroxide and reapplied to the carbonaceous material to enhance the liquefaction reaction. The said conversion of gas may be enhanced by the presence of disassociated molecules, for example oxygen molecules, resulting from the depressurisation of supercritical or superheated aqueous solution by a jet pumping nozzling means. In an embodiment, hydrogen and/or methane gas recovered at the surface may be recycled back into the reaction zone to enhance the liquefaction reaction. Whilst not wanting to be bound by this theory, the liquefaction reaction of the present invention may produce little free hydrogen (eg hydrogen gas) as hydrogen is consumed in the reaction process, which is in contrast with many prior art methods. In an embodiment, the ratio of liquid:gas produced is approximately 20:1.

In an embodiment, an aqueous solution of the present invention is alkaline. The solution may be alkaline due to the liquefaction reaction, or it may be adjusted to be alkaline using any method known to those skilled in the art. For example, the pH of the solution may be adjusted using sodium hydroxide, perborate, percarbonate, coal ash, calcium oxide or lime. In a preferred embodiment, the pH of the aqueous solution is above pH8. In a preferred embodiment, the pH of the aqueous solution is above pH10, or even pH 11. However, it is to be understood that it is also possible for the aqueous solution to alternatively be acidic.

An in situ carbonaceous material formation can be overlaid with an at least partially encapsulating layer to enhance the containment of the solutions, temperature and pressure within the formation. In this context "encapsulating layer" refers to a layer introduced to lie over and partially seal a coal formation. Partial encapsulation may also facilitate a higher working pressure within the reaction zone (eg possibly 50 KPa). Partial encapsulation may also facilitate reducing loss of the aqueous solution or the continuing reaction solution from the reaction zone to the surroundings. The at least partially encapsulating layer may be formed from any material known to be suitable for encapsulating a coal formation, for example, cement. A cement slurry can be injected between the coal formation and the surrounding formation providing a substantially impermeable and strengthened cement skin using any method known to those skilled in the art. This skin of cement may be only 3-10 inches thick. The encapsulating layer may be overlaid over only the area of the formation being liquefied, and it can be progressively extended as the area of the carbonaceous material being liquefied extends.

Pressure within the formation can also be regulated using a number of techniques. For example, pressure can be regulated by modifying the rate of application of the aqueous solution. Further, pressure can be regulated by modifying the pressure setpoint of the apparatus (eg a jet pumping means, a carbonaceous material liquefaction apparatus, etc) which applies the aqueous solution. In another embodiment, pressure within the coal formation can also be regulated by the recovery rate of steam produced in the process ("hydrological venting"). Excess steam can be vented to reduce pressure, or alternatively, steam recovery can be decreased to increase pressure. De-energised steam (after going through a turbine or a heat exchanger) can also be recycled back into the coal formation to increase pressure. Additionally or alternatively, the pressure in the reaction zone is most directly controlled by the setpoint of a back pressure controller controlling the recovered flow of steam and liquid hydrocarbon and various particulates from the annulus of the well. In another embodiment, pressure can be regulated by varying the rate of the liquefaction reaction by raising or lowering the pH of solution, or by varying the components of the solution. For example, a lower reaction rate will produce lower pressures, whereas a higher reaction rate will produce higher pressures.

Pressure may be applied to the reaction zone in a carbonaceous material formation if it is desired. For example, coal is normally considered a brittle substance as the fracture pressure of coal is around 12 MPa. The term "fracture pressure" refers to the amount of pressure required to induce fracturing of the coal formation. Thus pressure of up to approximately 12 MPa can be applied to a coal formation without prematurely fracturing the coal.

An in situ carbonaceous material can advantageously be strengthened using any method known to those skilled in the art to enhance the liquefaction reaction. For example, "sequential fracturing and overstressing" of a coal formation can be performed. Preferably, a carbonaceous material, such as coal, can be strengthened by "softening". Coal "softens" in the presence of certain solutions, a phenomenon referred to as a "glass-to-rubber" transformation, "softening" or "plasticising" of the coal. The softening of coal greatly increases its tensile strength, and accordingly, it may be possible to apply much greater pressure to softened coal than would otherwise be possible without prematurely fracturing the coal. Essentially, the softening occurs as a precursor of liquefaction due to the swelling of coal upon application of a liquefying solution. The coal surrounding the reaction zone where the high-velocity superheated water is applied will soften and liquefy. Coal is known to go through an initial "glass to rubber" transition upon liquefaction. The reference to "glass" describes the brittle and impermeable nature of coal in its original state, and the reference to "rubber" describes the elastic and ductile transformation that the coal undergoes as a result of solvent swelling during liquefaction. This "glass to rubber" transformation increases the elasticity or ductility of coal during liquefaction (increasing the fracture pressure of the coal). Therefore, the softened properties of the coals lining the reaction zone are expected to help contain the reaction products within the reaction zone without premature fracturing of the coal as could otherwise be the case. Thus, the carbonaceous material may be softened by the liquefaction reaction due to the application of the aqueous solution, which may facilitate an increase in tensile strength.

Accordingly, in an embodiment of the invention, the liquefaction reaction facilitates softening of the carbonaceous material surrounding the reaction zone during the liquefaction reaction, thereby enabling pressure to be applied to the carbonaceous material surrounding the reaction zone without fracturing the said surrounding carbonaceous material. Preferably, the liquefaction reaction is contained to the softened carbonaceous material.

Softening of the carbonaceous material may allow pressure above the usual fracture pressure of the carbonaceous material to be applied to the softened portion of the carbonaceous material surrounding the reaction zone without fracturing the said softened portion of the carbonaceous material. Sufficient pressure may be applied to the reaction zone to facilitate the continuing reaction solution being in a superheated or supercritical phase to enhance the liquefaction reaction. Following initiating the liquefaction reaction, pressure up to 12 MPa may be applied to the reaction zone of the coal formation without prematurely fracturing the coal. Preferably, pressure up to 22 MPa (the critical pressure for water) is applied to the coal formation without fracturing the coal. Preferably, pressure up to 35 MPa is applied to the coal formation without fracturing the coal. Pressure can be applied to a coal formation by any method known to those skilled in the art.

Coal is a relatively impermeable substance; however, softened coal has increased permeability. In an embodiment, unreacted coal with low permeability surrounds the reaction zone, both the heat and the solution will be retained in the reaction zone within this softened coal. Accordingly, the liquefaction reaction may be contained to the softened coal. Preferably, liquefaction of coal using a supercritical aqueous solution occurs when the reaction zone is substantially surrounded by an unreacted coal. The surrounding unreacted coal may facilitate buffering and containing of a substantial proportion of the heat, pressure, and aqueous solution within the reaction zone. In an embodiment, liquefaction of coal which is not substantially surrounded by an unreacted coal formation may be liquefied by the liquefaction reaction at lower temperature and/or lower pressure, that is, "low severity" liquefaction.

Advantageously, the in situ liquefaction of the carbonaceous material offers a more effective means to capture heat energy than does in situ gasification processes, as little energy is lost from the reaction zone due to the impermeable and insulating nature of coal. Thus the heat energy produced by the liquefaction reaction may be transferred with limited loss to the in situ continuing reaction solution. Accordingly, heat energy may be efficiently stored in the continuing reaction solution. Preferably, heat energy produced by the liquefaction reaction can be recovered at the surface, wherein the recovering of the heat energy is facilitated by a heat exchanging means. Temperature can be controlled by modifying the amount of heat energy that is recovered or vented from the reaction zone. The heat exchanger means may be any heat exchanger means known to those skilled in the art. The energy transfer may, for example, result in the generation of electrical power.

Advantageously, the method of the present invention may produce heat energy that can be recovered from steam that is quite capable of exceeding the input energy required to convert the aqueous solution to a supercritical or superheated fluid and pump it through a nozzle assembly. This may be due at least in part because many carbonaceous materials contain a % content of moisture in the geological formation. Due to the exothermic nature of the liquefaction reactions and due to the temperature of the water with supercritical properties contacting the carbonaceous material and also due to the transfer of kinetic velocity energy upon collision into internal molecule activation energy; these transfers of energy can mobilise the additional moisture content of a carbonaceous material to be recovered at surface as additional steam or heat energy, which dependant on the moisture content can exceed the total of the input energy required to facilitate the process.

The characteristic (ie quality or other properties such as "lightness" or "heaviness") of the produced liquid hydrocarbon can also be varied using any techniques known to those skilled in the art. For example, the pH of the aqueous solution may be modified or the concentration of the components of the aqueous solution may be modified, either of which may modify the characteristics of the produced liquid hydrocarbon. In some embodiments, the components of the aqueous solution may be changed. In one example, methane gas may be fed into the reaction zone to increase the amount of methane being converted into methanol in the reaction zone. Alternatively, an increased amount of methanol may be added to the aqueous solution prior to application to the coal formation. Advantageously, the liquid hydrocarbon produced has low sulphur content facilitated by the combination of in situ oxidation and hydrogenation of the carbonaceous material with hydrogen peroxide and the interaction of entrained mineralisations within low rank coal or other carbonaceous materials. Advantageously, the liquid hydrocarbon produced has super low emissions of sulphur dioxide and nitric oxide when combusted, which is lower than conventional oil fuels.

The liquid hydrocarbon produced by embodiments of the present invention may be used as a fuel source in its raw state, or it may be distilled and upgraded to produce fuels such as synthetic crude and petroleum. It will be appreciated that the raw liquid hydrocarbons produced by the method of the invention may contain impurities such as sulphur, nitrogen, etc, and such impurities may be removed by purification etc as required. For example, the produced liquid hydrocarbons undergo cyclonic separation to remove solid particulate matter present within the liquid hydrocarbon.

Advantages of the present invention include potential lower cost per barrel of the liquid hydrocarbon produced and potential lower capital and infra-structure costs compared with existing liquefaction technologies. Further, an advantage of the present invention may include faster, more efficient or more complete utilisation of a carbonaceous material formation, including utilisation of "stranded" carbonaceous material resources, which by virtue of depth, geographical isolation, impurities, low rank or small size of the reserve would remain otherwise unutilised as they are considered too difficult or expensive to mine using conventional techniques. Laboratory experiments suggest the conversion of liquid hydrocarbon per ton of coal using the liquefaction reaction may be as high as 3 barrels of liquid hydrocarbon per ton of coal.

EXAMPLES

Example 1

Reaction of Raw Anglesea Coal with 30% or 50% Hydrogen Peroxide

Introduction

In a preliminary investigation, the reactivity of raw Anglesea coal with 30% (w/w) and 50% (w/w) hydrogen peroxide was examined.

Materials and Methods

Sample

The raw Anglesea coal sample was obtained from the Anglesea Coal Deposit, located near Anglesea, Victoria, Australia. The Anglesea coal is a low-rank lignite coal. The raw coal sample was obtained from the deposit from a horizontal working coal face at approximately the middle of the seam. Five individual coal samples of approximately 3-4 kg each were collected and stored in sealed plastic bags within 5 L sealed plastic buckets. Due to the presence of large lumps, the Anglesea coal was coned, quartered and a sub-sample crushed with a mortar and pestle such that the particle size was similar to that of the Lock coal (described below). The particle size was <5 mm.

Reaction with Hydrogen Peroxide 16.9 g of raw Anglesea coal was placed in a 2 L measuring cylinder to which 25 mL of 30% (w/w) or 50% (w/w) hydrogen peroxide [ACR Laboratory Reagent] was added. The reaction temperature was continuously monitored using a type K thermocouple immersed in the coal/hydrogen peroxide slurry.

Results and Discussion

The study found the reaction of Anglesea coal with 30% (w/w) hydrogen peroxide or 50% (w/w) hydrogen peroxide to be vigorous with significant heat evolution and gas release.

The ambient temperature of the hydrogen peroxide solution prior to the addition of the coal was 21.3° C.

The addition of coal to 30% (w/w) hydrogen peroxide surprisingly resulted in a maximum temperature of 101.1° C., approximately 19 minutes after the addition of coal. Significant gas release occurred. The coal and hydrogen peroxide mixture started to foam after 18.37 min when the temperature reached approximately 78° C. The study found the reaction of coal with hydrogen peroxide to be vigorous with significant heat evolution and gas release.

The addition of coal to the 50% hydrogen peroxide solution resulted in a temperature of 23.8° C. at 2 mins after addition of the coal, and a small amount of gas evolution was observed. By 8 mins, the solution had obtained a temperature of 34.7° C., the effervescence had notably increased and a thin layer of foam was visible on top of the solution. At 12 mins, the solution was markedly foaming and a temperature of 66.0° C. was obtained. Within a few seconds, a temperature of 70.0° C. was obtained, at which evolution became intense and the foamy solution rapidly expanded. At approximately 13 mins, a maximum temperature of 96.9° C. was obtained. Photographs of the reaction at 2, 12 and 13 minutes are provided in FIG. 1 at A, B and C, respectively.

These experiments clearly show that a hydrogen peroxide solution of either 30% or 50% is capable of reacting with coal in an exothermic reaction that rapidly produces a substantial amount of heat.

Example 2

Characterisation of Components of Lock and Anglesea Coal Reacted with Hydrogen Peroxide Introduction The study analysed the reactivity of Lock and Anglesea coal with 50% (w/w) hydrogen peroxide in more detail. Of particular interest is the effectiveness of hydrogen peroxide to initiate an exothermic reaction with coal. The chemical composition of the samples was monitored prior and post reaction, and a mass and energy balance undertaken. In addition, the evolved gas volume and gas composition was determined. Both the condensate sample and the liquid component of the residue samples were characterised for their semi-volatile and volatile organic carbon content.

Materials and Methods
Samples and Sample Preparation

Anglesea coal was used as described above. The raw Lock coal was obtained from coal deposits known as the Lock Coal Deposit, located near the town of Lock, in the Polda Basin of central western Eyre Peninsula, South Australia, Australia. The Lock coal is a low-grade sub-bituminous coal of Late Jurassic age. Raw Lock coal samples were obtained from Centrex Resources Ltd, Adelaide, Australia. The raw Lock coal had a particle size of <5 mm, and was analysed as obtained.

Procedure for Reaction

Figure 2:
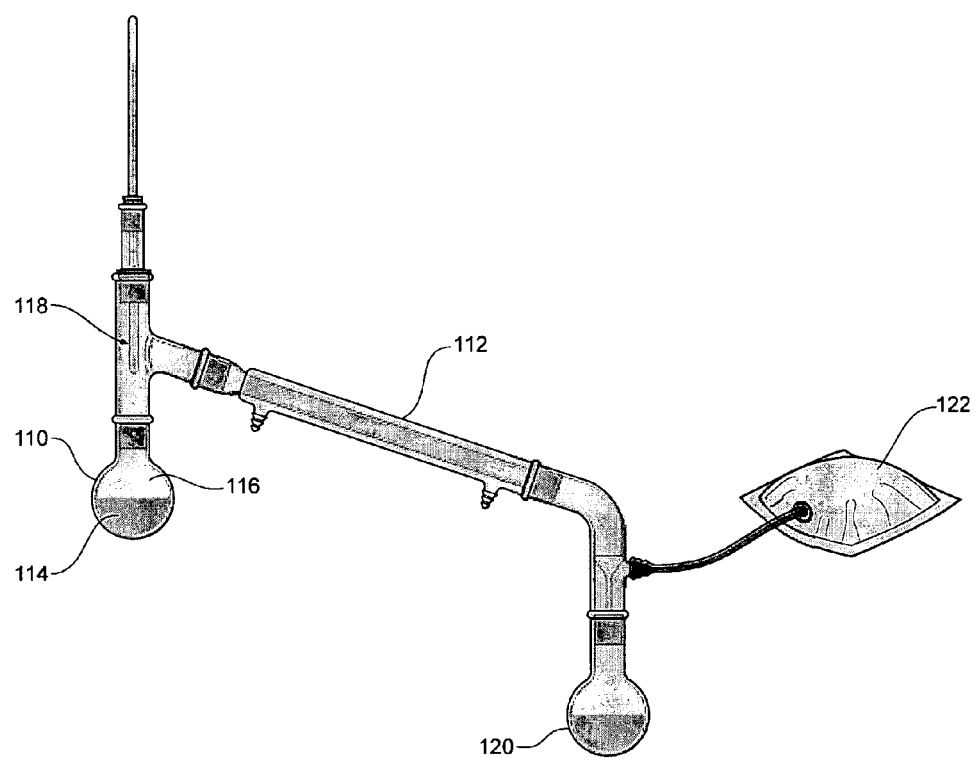
FIG. 2 provides a schematic diagram illustrating the arrangement of the apparatus used for the characterisation of the reaction with hydrogen peroxide.

A schematic of the experimental apparatus used to study the reaction of the coal samples with hydrogen peroxide is shown in FIG. 2. The equipment consisted of a 1 L three-necked thermally insulated round bottom flask (vessel) 110 in which the reaction occurred. The vessel was fitted with a Liebig condenser 112 and three type K thermocouple inlets 114, 116, 118. Thermocouple inlet 114 measured the temperature of the solution (slurry) in the vessel, thermocouple inlet 116 the temperature of the gas within the vessel, and thermocouple inlet 118 measured the temperature of the gas prior to condensation. The temperature was monitored continuously via a temperature data logger. The evolved gases were cooled using the Liebig condenser 112 and the condensed gases collected in a pre-weighed round bottom flask (RBF) 120 as the condensate. The fixed gases were passed into a 10 L Tedlar gas collection bag 122. Upon ceasing of gas evolution, the Tedlar bag 122 was disconnected and the system allowed to cool to room temperature 16.9 g of coal was weighed and placed in the vessel. After purging the vessel with high purity nitrogen, 29.9 g (25 ml) of 50% (w/w) hydrogen peroxide was added to the sample. Samples were not stirred as preliminary studies found this to be ineffective in suppressing foam formation. The reaction was considered complete upon cessation of gas evolution. After completion of the reaction, the reacted contents within the vessel were subsequently weighed and the mass loss determined. The coal residue (ie liquid and solid remnants of the reaction) was removed from the vessel and analysed for moisture content, ash yield, carbon, hydrogen, nitrogen, total sulphur content and calorific value. Subsequently, the residue was the residue was centrifuged and passed through a 1.2 μm filter, and the filtrate analysed for total carbon content.

The semi-volatile (SVOC) and volatile (VOC) organic carbon content of the samples was determined by gas chromatography-mass spectrometry (GS/MS). The condensate mass was determined and analysed for total carbon content and SVOC and VOC by GC/MS. The non-condensed (fixed) gases were analysed using a gas chromatograph fitted with a thermal conductivity detector (GC/TCD).

An identification number for each of the samples is given in Table 2.

TABLE 2

Identification Numbers

| Identification Number | Sample Description |
|---|---|
| CMM/09/0362-01 | Raw Lock coal |
| CMM/09/0362-02 | Lock coal residue |
| 09/0362-09 | Lock coal residue filtrate |
| 09/0362-03 | Lock coal condensate |
| 09/0362-04 | Lock coal gas |
| 09/0362-08 | Raw Anglesea coal |
| 09/0362-05 | Anglesea coal residue |
| 09/0362-10 | Anglesea coal residue filtrate |
| 09/0362-06 | Anglesea coal condensate |
| 09/0362-07 | Anglesea coal gas |

Sample Analysis

The moisture content and ash yield were performed using a Leco MAC Analyser. Samples were weighed to constant mass in air at 110° C. to determine the moisture content, and then were heated in oxygen to 815° C. to determine the ash yield.

Carbon, hydrogen and nitrogen contents were determined according to Australian Standard 1038.4 using a Leco CHN Analyser. In this method, a known mass of sample is combusted at a 1000° C. under an oxygen atmosphere. The combustion gases are collected and the hydrogen and carbon contents determined by measuring the water and carbon dioxide concentrations using infra-red spectroscopy a solid state infrared detector. The nitrogen content is determined by thermal conductivity. The instrument is calibrated using a reference sample.

Sulphur was determined according to Australian Standard 1038.6.3.2. In this method a known mass of sample is combusted at high temperature in an oxygen atmosphere. All of the sulphur present in the sample is oxidized to sulfur dioxide. Moisture and dust are removed and the sulfur dioxide gas measured by a solid state infrared detector. The instrument is calibrated using a reference sample of known sulfur content.

The calorific value was determined on a Leco AC350 calorimeter, according to Australian Standard 1038.5. In this method, the sample is burnt in oxygen inside a steel bomb and the heat evolved is transferred from the bomb to the surrounding water jacket. The temperature increase of the water jacket is accurately measured, corrected for environmental effects and the calorific value (CV) of the sample calculated. The calorimeter is calibrated prior to analysis by combustion of reference materials of known CV The gas composition was determined using a Gas Chromatograph fitted with a thermal conductivity detector (GC/TCD).

The condensate and the residue filtrate were sent to ALS Laboratory Group, Australia for semi-volatile organic carbon (SVOC), volatile organic carbon (VOC) analysis, and gas chromatography-mass spectrometry (GC/MS).

Results and Discussion

Experimental Observations

Figure 3:
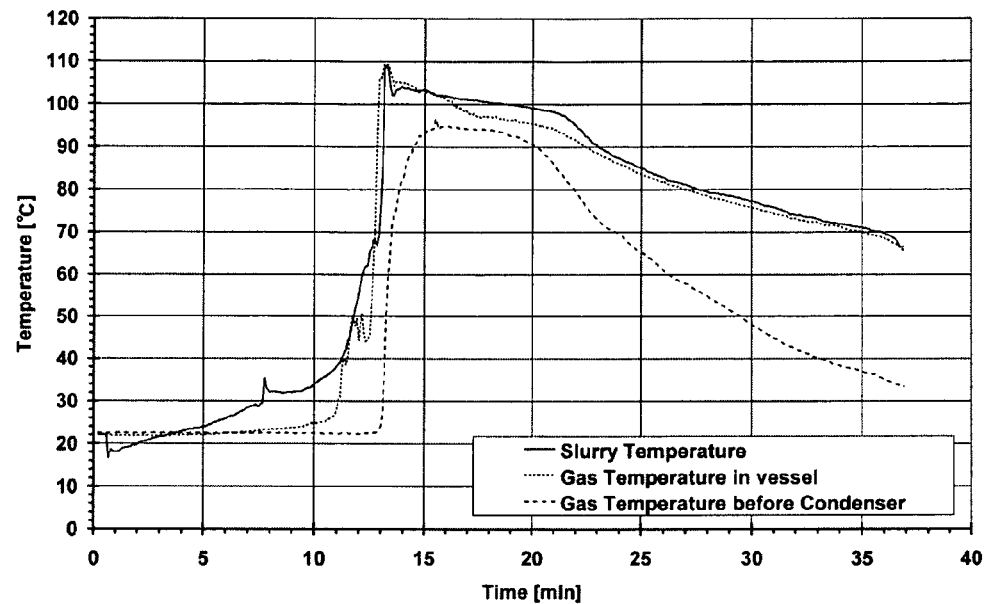
FIG. 3 provides a plot showing the temperature profiles of the solution (slurry) and gas temperature in the reaction vessel and prior to condensation during the reaction of 50% (w/w) hydrogen peroxide and raw Lock coal.
Figure 4:
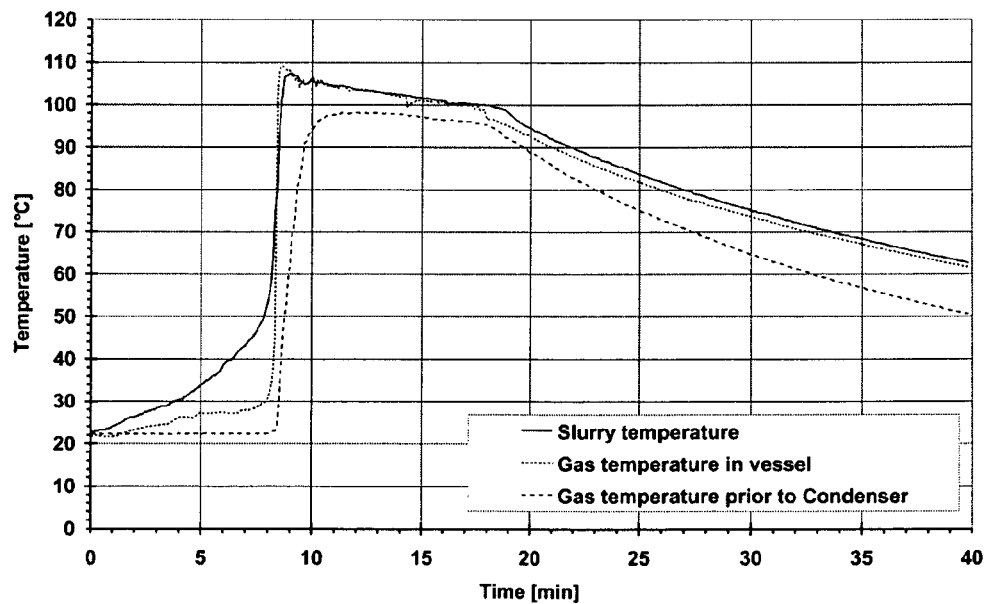
FIG. 4 provides a plot showing the temperature profiles of the solution (slurry) and gas temperature in the reaction vessel and prior to condensation during the reaction of 50% (w/w) hydrogen peroxide and raw Anglesea coal.

The temperature profiles for the slurry of the Lock or Anglesea coals reacted with 50% (w/w) hydrogen peroxide, as well as the temperature profiles for the gas in the reaction vessel and prior to condensation are shown in FIG. 3 (Lock coal) or FIG. 4 (Anglesea coal). For both coal samples, the initial reaction rate was slow, with a temperature increase of less than 2° C./min. After about 10 minutes when the samples were at approximately 40° C., the reaction rate increased rapidly, with the slurry temperature surprisingly increasing to 110° C. over a 2 to 2.5 minute period.

For the Anglesea coal, the first major release of gas entering the condenser occurred at a gas temperature (inside the reaction vessel) of 72° C. A large volume of gas was released instantaneously and was white in colour. No liquid could be seen condensing on the condenser until a gas temperature (inside the reaction vessel) of 105.8° C. was obtained. The condensate derived from the Anglesea coal had a clear, water like appearance. The residue derived from the Anglesea coal was brown in colour.

Figure 5:
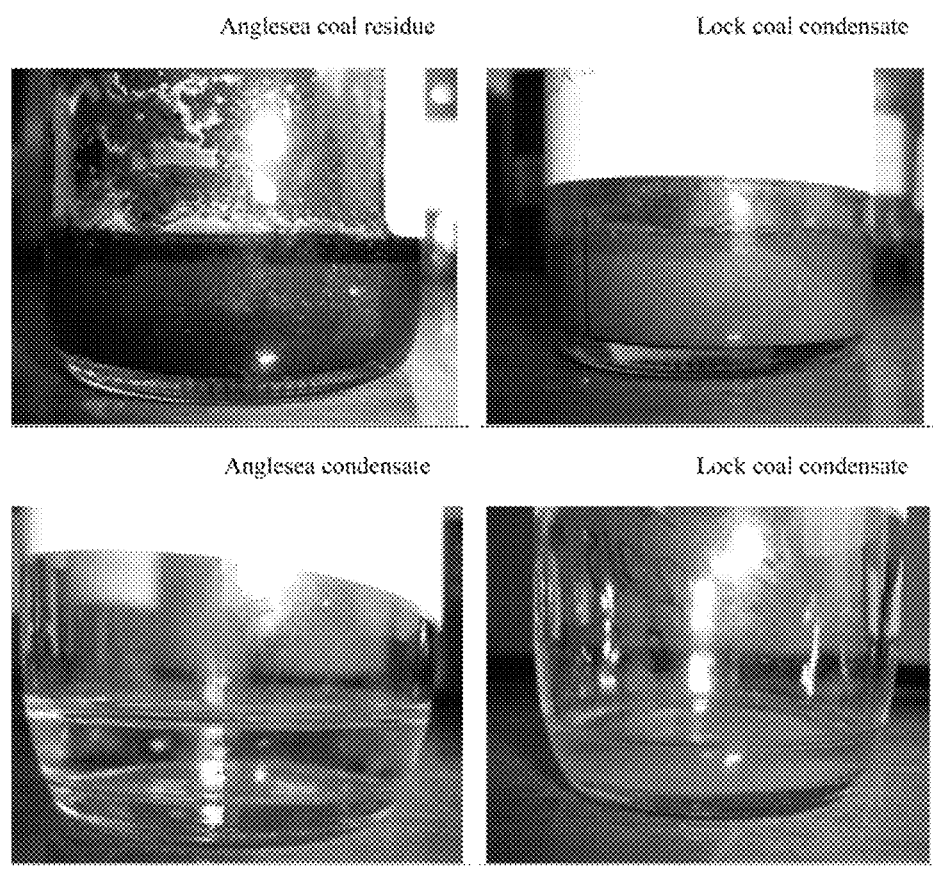
FIG. 5 provides photographs showing appearance of residue and condensate samples derived from Anglesea and Lock coal samples.

The residue derived from Lock coal had a light brown appearance; whilst the condensate derived from the Lock coal had a slight yellow appearance, which is believed to be due to a slight overflow of reactor contents. The residue left behind in the reactor for both coals had a sludge-like appearance with a liquid layer on the surface. The residue derived from the Anglesea coal was red-brown in colour, while the residue derived from Lock coal had a grey-brown appearance. Photographs of the residue and the condensates are shown in FIG. 5.

Mass Balance

A mass balance of reactants (ie coal and the hydrogen peroxide solution) and products (ie coal residue, condensate and gas) shows good resolution, with less than 2% of material being unaccounted for (Table 3). The condensate mass was 7 g for the Lock coal and 13 g for the Anglesea coal.

TABLE 3

Mass balance of reactant inputs and product/waste outputs

|  | Lock coal | Anglesea coal |
|---|---|---|
| Input |  |  |
| Mass of coal [g] | 16.9 | 16.9 |
| Mass of 50% $H_2O_2$ [g] | 29.9 | 29.9 |
| Total | 46.8 | 46.8 |
| Output |  |  |
| Mass of Residue [g] | 30.4 | 25.4 |
| Mass of Condensate [g] | 9.0 | 14.8 |
| Mass of Gas [g] | 6.6 | 6.0 |
| Total [g] | 46.0 | 46.2 |
| Difference [%] | 1.7 | 1.3 |

Chemical Analysis of Raw Lock and Anglesea Coal

The chemical analysis results, including calorific value, for the raw Lock and Anglesea coals is shown in Table 4. The corresponding results expressed on a dry ash free basis are shown in Table 5. The as received moisture content of the Lock coal was 22.5% (wet basis, wb). The ash content was 41.4%, dry basis (db). The Gross wet Calorific value of the coal was 11.7 MJ/kg. The as received moisture content of the Anglesea coal was 44.8% (wb). The ash content was 2.9% (db). The Gross wet Calorific value of the Anglesea coal was 15.6 MJ/kg. Accordingly, the two coal are of different qualities. The Anglesea coal has a higher calorific value and a much lower ash content than the Lock coal, indicating that it is a higher quality coal. This was surprising given that the Lock coal is a higher ranked coal (a sub-bituminous coal whereas the Anglesea coal was a lignite coal). Nonetheless, it is clear that both the calorific content and the ash content of the coals were halved by the peroxide treatment.

TABLE 4

Chemical Analysis of as received and residue samples derived from Lock and Anglesea coal

| Identification | | Moisture | Ash yield | Ultimate Analysis (% db)[b] | | | | | Calorific Value (MJ/kg) | | |
|---|---|---|---|---|---|---|---|---|---|---|---|
| Number | Sample Description | (% wb, ar)[a] | (db) | C | H | N | $S_T$ | $O_{(diff)}$[c] | Gross dry | Gross wet | Net wet |
| 09/0362-1 | Lock coal raw | 22.5 | 41.5 | 37.45 | 3.87 | 0.427 | 0.68 | 16.07 | 15.11 | 11.7 | 10.6 |
| 09/0362-2 | Lock coal residue (Solid + Liquid) | 55.2 | 21.7 | 31.41 | 3.77 | 0.432 | 0.53 | 42.16 | 12.53 | 5.6 | 4.0 |

TABLE 4-continued

Chemical Analysis of as received and residue samples derived from Lock and Anglesea coal

| Identification | | Moisture | Ash yield | Ultimate Analysis (% db)[b] | | | | | Calorific Value (MJ/kg) | | |
| --- | --- | --- | --- | --- | --- | --- | --- | --- | --- | --- | --- |
| Number | Sample Description | (% wb, ar)[a] | (db) | C | H | N | $S_T$ | $O_{(diff)}$[c] | Gross dry | Gross wet | Net wet |
| 09/0362-5 | Anglesea coal raw | 44.8 | 2.9 | 68.5 | 5.3 | 0.61 | 2.8 | 19.89 | 28.2 | 15.6 | 13.9 |
| 09/0362-5 | Anglesea coal residue (Solid + Liquid) | 59.6 | 1.0 | 56.83 | 4.60 | 0.706 | 3.19 | 33.67 | 21.38 | 8.6 | 6.9 |

Notes:
[a] wb: wet basis; ar: as received
[b] db: dry basis
[c] $O_{(diff)}$: oxygen determined by difference ($O_{diff}$ = 100 − (Ash yield + % C + % H + % N + % S))

where:

$$\%\text{Moisture, wb} = \frac{m(\text{water})}{m(\text{water}) + m(\text{coal})} \quad \text{and} \quad \%\text{Moisture, db} = \frac{m(\text{water})}{m(\text{coal})}$$

TABLE 5

Chemical Analysis of as received and residue samples derived from Lock and Anglesea coal-expressed on a dry ash free basis

| HRL Sample Number | Sample Description | Moisture (% wb, ar)[a] | Ash yield (db) | Ultimate Analysis (% daf)[b] | | | | | Calorific Value (MJ/kg) | | |
| --- | --- | --- | --- | --- | --- | --- | --- | --- | --- | --- | --- |
| | | | | C | H | N | $S_T$ | $O_{(diff)}$[c] | Gross dry | Gross wet | Net wet |
| /09/0362-1 | Lock coal raw | 22.5 | 41.5 | 64.02 | 6.62 | 0.73 | 1.16 | 27.48 | 15.11 | 11.7 | 10.6 |
| /09/0362-2 | Lock coal residue (Solid + Liquid) | 55.2 | 21.7 | 40.11 | 4.81 | 0.55 | 0.68 | 53.84 | 12.53 | 5.6 | 4.0 |
| /09/0362-8 | Anglesea coal raw | 44.8 | 2.9 | 70.55 | 5.46 | 0.63 | 2.88 | 20.48 | 28.2 | 15.6 | 13.9 |
| /09/0362-5 | Anglesea coal residue (Solid + Liquid) | 59.6 | 1.0 | 57.40 | 4.65 | 0.71 | 3.22 | 34.01 | 21.38 | 8.6 | 6.9 |

Notes:
[a] wb: wet basis; ar: as received
[b] daf: dry ash free basis
[c] $O_{(diff)}$: oxygen determined by difference ($O_{diff}$ = 100 − (% C + % H + % N + % $S_T$))

Chemical Analysis of Coal Residue

For both the Lock and Anglesea coals, the reaction with hydrogen peroxide resulted in an approximate halving of the ash yield (Table 4, comparing raw coal value to the residue value). This may indicate that the ash is dissolving into the aqueous phase which may not have been sampled representatively.

The elemental composition expressed on a dry ash free basis (Table 5) shows a significant increase in oxygen and decrease in carbon content of both coals when reacted with hydrogen peroxide. This is the result of the coal undergoing partial oxidation, which has also resulted in the formation of carbon monoxide and carbon dioxide gas, as well as water-soluble volatile and semi-volatile organic compounds. For both coals, this led to an approximate halving of the gross net calorific value of the residue compared to the raw coal.

The total carbon content of the residue filtrate sample was 47 g/L for the Lock coal and 97 g/L for the Anglesea coal. These high carbon concentrations clearly indicate the presence of dissolved organic and/or inorganic compounds within the liquid component of the reaction residue. Previous studies on the hydrothermal drying of low rank coals (under inert environments) showed organic carbon concentrations in the order of 7 g/L in the liquid water phase (Racovalis et al., 2002). Under strong oxidising conditions, as used in this study, the amount of water soluble organics are expected to be significantly higher.

Screening GC-MS analysis of the residue filtrates and condensates (Table 6) identified the presence of semi-volatile organic compounds containing carboxylic acid type functional groups, including substituted butanedioic acid, benzoic acid, and hexadecanoic acid. The combined concentration of these compounds was 0.4 g/L. In addition, there were several organic compounds (~0.5 g/L) and aliphatic compounds (<0.1 g/L). This is indicative of production of desirable liquid hydrocarbons as well as high levels of dissolved organic compounds that are capable of enhancing a continuing liquefaction and/or mobilising the entrained water as steam for recovery at surface for power generation and/or as a source of recoverable water.

No volatile organic compounds were found in the Lock residue filtrate sample, whereas the Anglesea coal residue filtrate contained a small amount of 2-Butanone (Table 6). It is thought that the experimental procedure followed may have not been sensitive enough to detect volatile organic compounds as the samples were unfortunately left uncovered at room temperature. Due to the high total carbon content, only a small fraction of organic compounds were identified by the GC-MS analysis technique. This may indicate that the high carbon content is comprised of oxidised coal products (e.g. humic and fulvic acids) which are difficult to detect. These products are indicative of liquid hydrocarbon production, and further, are considered organic solvents that can enhance coal liquefaction.

TABLE 6

Semi volatile and volatile compounds present in Lock and Anglesea residue and condensate samples

| Sample | Compound | 09/0362-02 Lock coal residue filtrate | 09/0362-03 Lock coal condensate | /09/0362-05 Anglesea residue filtrate | 09/0362-06 Anglesea condensate |
|---|---|---|---|---|---|
| SVOC (mg/L) | Substituted Butanedioic acid | 280 | | | |
| | Benzoic acid | 58.3 | | 32.4 | |
| | Hexadecanoic acid | 29.8 | | | |
| | Phenyl-Butanone | | 27.9 | | 35.8 |
| | Bibenzyl | | | | 11.56 |
| | Unidentified organic compounds | 491 | | 546 | |
| | Unknown aliphatic compounds | | | 105 | |
| VOC (mg/L) | 2-Butanone (MEK) | No VOC's identified | 15.8 | 0.7 | 53.3 |
| | 4-Methyl-2-pentanone (MIBK) | | | | 0.4 |
| | 2-Hexanone (MBK) | | | | 0.54 |
| | Vinyl Acetate | | | | 0.09 |

Chemical Analysis of Condensate

The pH of the condensate was very low (pH=2) which is most likely due to the dissolution of $SO_2/SO_3$ gas. The condensate samples contained 4 to 5 g/L of carbon, indicating the presence of dissolved organic carbon. During GC-MS analysis, ketone-based semi-volatile and volatile organic compounds (<100 mg/L) were identified (Table 6). Some of the organic compounds have been identified. Previous studies on the oxidation of brown coal using hydrogen peroxide have investigated the composition of the water soluble organic fraction. In these studies the main compounds identified were carboxylic acids, hydroxylcarboxylic acids, ketones, aldehydes and alcohols (Zhen-Xue Liu et al., 2003; Bergh et al., 1997).

Chemical Analysis of Gas

A list of evolved gases produced during the reaction is shown in Table 7. It should be noted that the gas compositions are corrected for volume contributions of nitrogen gas, which was used to purge the reactor prior to the experiment. Four main gas species were identified, these being oxygen, nitrogen, carbon dioxide and carbon monoxide. In addition, the chromatogram showed a peak, which could not be identified and requires further investigation. The high oxygen concentration is largely due to the decomposition of hydrogen peroxide to water and oxygen. It should be noted that the gas had a sulphurous smell indicating the presence of small amounts of sulphur based species. These could not be measured by the current GC-TDC method.

TABLE 7

Composition of gases evolved during the reaction of Lock and Anglesea coal with hydrogen peroxide

| Gas Composition | Lock coal (vol %) | Anglesea coal (vol %) |
|---|---|---|
| $O_2$ | 69.1 | 21.7 |
| $N_2$ | 1.2 | 14.2 |
| $CO_2$ | 3.3 | 15.6 |
| CO | 2.1 | 4.1 |
| Unknown | 24.3 | 44.4 |
| Total | 100 | 100 |

Note:
Gas composition has been corrected for the volume contribution of nitrogen gas used to purge the reactor.

Energy Balance

A breakdown of the energy balance for the reaction of Lock and Anglesea coal with 50% (w/w) hydrogen peroxide is provided in Table 8. Based on the difference in net wet calorific value between the raw coal and residue, a total of 58 kJ for the Lock coal (3.62 MJ/kg of wet coal), and 62 kJ (3.42 MJ/kg of wet coal) for the Anglesea coal were released during the reaction. This heat was partially consumed in the vaporisation of water and the heating of the reactor, slurry and gas. In addition, there is heat contained within the gas due to the presence of carbon monoxide, which is combustible.

Thus, it is clear that the reaction between Lock and Anglesea coal and concentrated hydrogen peroxide (50% w/w) is highly exothermic and results in the evolution of oxygen, carbon dioxide, carbon monoxide and nitrogen gas. Additionally, the reaction resulted in the liberation of 3.42 MJ of heat per kg of raw Lock coal and 3.62 MJ per kg of raw Anglesea coal. The residue filtrate (ie the liquid fraction of the reaction) had a very high dissolved carbon content (approximately 50 to 100 g/L), only a fraction of which could be accounted for by GC-MS analysis. The main compounds identified by GC-MS were semi-volatile compounds containing carboxylic acid functional groups. The high carbon content may be due to humic and fulvic acids. The condensate collected during the course of the experiment contained both semi-volatile and volatile organic compounds. These organic compounds predominantly consisted of ketones. As with the residue filtrate fraction, a large component of the total carbon content was unaccounted for and further analysis is required to identify these species.

It is clear from these results that the reaction of coal with a hydrogen peroxide solution is strongly exothermic, this indicates that the reaction of a large amount of a carbonaceous substance with hydrogen peroxide in situ would be sufficient to rapidly elevate the temperature of the highly insulative reaction zone to a desired temperature, for example, at least between 300° C. and 400° C. Further, the high carbon content of the residue filtrate indicates that liquefaction is occurring more rapidly than has been previously reported, and that child solvents are evolved during the liquefaction process that enhance the liquefaction process as described herein. It has previously been shown that the majority of dissolved carbon molecules during similar liquefaction experiments are predominantly methanol and acetic acid (Li, 2004, refer to paragraph 1.3.5).

Prophetic Example 1

Liquefaction of Lignite In Situ by Hydrogenation with an Aqueous Solution of Methanol and Hydrogen Peroxide The coal formation to be liquefied is a low rank lignite coal formation lying approximately 400 feet below the surface of the ground. The coal formation has an entrained water content of 60% and is covered by water, and contains entrained mineralisations. A well bore is drilled into the surface the coal formation. The coal formation may optionally be fractured around the well bore, if it is advantageous due to the properties of the formation. An aqueous solution is applied to a coal formation via an injection well to initiate the liquefaction reaction.

The aqueous solution comprises hydrogen peroxide, methanol and a borate catalyst. The aqueous solution can optionally be prepared by dissolving sodium perborate into water and then adding methanol, as sodium perborate forms hydrogen peroxide and borate upon contact with water. The liquefaction of the coal in contact with the aqueous solution is rapid, resulting in the production of liquid hydrocarbon. Impurities are released from the coal formation, which are capable of catalysing the liquefaction reaction. For example, trace minerals found in coal including pyrene and pyridine also act as catalysts for the hydrogenation reaction and increase the liquefaction of coal. Water is also released. The reaction is strongly exothermic and the temperature within the reaction zone rises the reaction proceeds.

Produced liquid hydrocarbon is recovered using a flood drive process, wherein the aqueous solution injection also acts as a drive mechanism to enhance the recovery of the liquefied coal out of adjacent or nearby "production" wells.

Prophetic Example 2

Initiating the Liquefaction Reaction with Hydrogen Peroxide and Methanol

As for Prophetic Example 1, a wellbore is drilled into a coal formation.

Water is chemically dosed to contain donor hydrogen solvents to produce an aqueous solution, specifically, 0.2%-30% methanol and 3 to 30% hydrogen peroxide. The hydrogen peroxide is produced by dissolving a sufficient amount of sodium percarbonate or sodium perborate into the water. Sodium perborate monohydrate will be preferred for this example because of its excellent solubility in water and safe and easy handling and storage and because it contains true peroxide bonds. On contact with water sodium perborate forms hydrogen peroxide and borate. Methanol is likewise dosed into the aqueous solution.

A modified jet pump well (as described in Prophetic Example 10 below) is used to apply the aqueous solution.

The application of the hydrogen donor solvents in the context of the aqueous solution results in the donation of hydrogen atoms to the coal molecules and facilitates liquefaction, and at the same time oxidates the coal in the reaction zone. Hydrogen peroxide facilitates both the hydrogenation and oxidation coal. Boron family catalysts are known to catalyse the transfer of hydrogen atoms to coal. This means that a diluted solution containing sodium perborate monohydrate applied to the coal formation will liquefy coal, for example, a diluted solution of 10% sodium perborate will provide 3% hydrogen by weight.

The concurrent or very nearly concurrent oxidation and hydrogen atom transfer (eg by a hydrogen donor solvent) advantageously facilitates increased yields and quality of liquid hydrocarbons. The rate of liquefaction is rapid, a matter of minutes. Hydroxyl radicals are formed from hydrogen peroxide, and these radicals advantageously react nearly instantly with most organic molecules in an aqueous solution, and are capable of transforming a wide range of organic molecules.

The liquefaction reaction process raises the pH of aqueous solution of the coal to or above pH of 10.

Trace minerals in the coal, such as pyrene and pyrite, and organic compounds such as pyridine, are released during the process. The trace minerals also act as catalysts and enhance liquefaction of coal in these conditions.

The application of the aqueous solution initiates a cascade of chemical interactions within the coal formation itself, which results in the liquefaction of the coal to liquid hydrocarbons. The liquefaction reaction rapidly rises the temperature within the reaction zone of the coal formation to approximately 300° C. The also results in the production of steam, which can be used to power a mechanical device on the surface such as a power turbine and the production of a large amount of de-mineralised water condensed from this steam. The reaction will also result in the production of hydrogen gas and methane gas. The hydrogen and methane gases are drawn off by a surface separator vessel and recycled back into the coal formation as part of a process which now continuously produces its own oxidant/hydrogen donor solvent hydrogen peroxide, as well as methanol as components of the aqueous solution; at negligible cost. The reaction continues to produces heat, which rises to 400° C.

Produced liquid hydrocarbons are recovered from the jet pump using a flood drive process.

Prophetic Example 3

Continuing the Liquefaction Reaction Using Flood Water Drive Recovery

Following initiation of the liquefaction reaction, a continuing liquefaction process is undertaken by continuing to apply the aqueous solution to the coal. The aqueous solution can comprise methanol and hydrogen peroxide, which generates hydrogen peroxide and methanol in situ in the reaction zone, at negligible cost. The continuing reaction continues to liquefy the coal and at the same time facilitates recovery using a flood drive recovery, facilitated by a modified jet pump as described in Prophetic Example 9.

The production of hydrogen peroxide in situ is facilitated by the application of an aqueous solution comprising 0.2% to 30% methanol, which promotes hydrogen peroxide production during the oxidation of hydrogen gas with oxygen gas, particularly when the aqueous solution is applied at a high velocity for example, using a jet pump. The temperature within the reaction zone rises due to the heat produced by the liquefaction reaction, which, together with the jet pump, facilitates the conversion of the aqueous solution into a superheated fluid. As the temperature of the reaction zone continues to rise, the aqueous solution is converted to a supercritical fluid. The aqueous solution is rapidly depressurised as it passes through the nozzle of the jet pump.

Hydrogen peroxide rapidly degrades on contact with coal into hydroxyl radicals, hydrogen gas and water. These hydroxyl radicals are intensely transformational on the organic components of coal. The action of hydroxyl radicals facilitates the liquefaction of coal. Hydroxyl radicals are virtually instant in their action and result in the generation of several sub-moieties of coal break down products, with the end result being the liquefaction of coal.

The liquefaction of coal can be catalysed by components released from the coal formation, for example, pyrite. Pyrite can induce the spontaneous generation of hydrogen peroxide and hydroxyl radicals in the presence of water. Accordingly, hydrogen peroxide is produced in the reaction zone, which facilitates the continuing reaction process.

Additionally, the continuing application of the aqueous solution can physically sweep the liquid hydrocarbon to the recovery wells using a flood drive process.

Prophetic Example 4

Continuing the Liquefaction Reaction Using Supercritical Methanol in Water

Coal liquefaction can be initiated as described above. At a suitable time point (for example when the reaction zone reaches above 300° C.), the aqueous solution is changed to methanol (eg up to 30%) in water. The combined action of the jet pump or pressure on the reaction zone and the temperature of the reaction zone can convert the aqueous solution to a superheated or supercritical fluid. Methanol enhances the supercritical properties of water. Optionally, recycled methane gas is oxidated to methanol within supercritical water due to the kinetic energy associated with the impact of the aqueous solution at the face of the coal formation following depressuring through a jet pump nozzle.

Prophetic Example 5

Continuing the Liquefaction Reaction Using Supercritical Water

Coal liquefaction can be initiated as described above. At a suitable time point (for example when the reaction zone reaches above 400° C.), the aqueous solution is changed to water. The combined action of the jet pump or pressure on the reaction zone and the temperature of the reaction zone can convert the aqueous solution to a superheated or supercritical fluid.

Prophetic Example 6

Rapid Depressurisation of the Aqueous Solution and Supercritical Lag

Coal liquefaction can be initiated and continued as described above. The aqueous solution comprises components selected from the group consisting of water, hydrogen peroxide, methanol and a catalyst. The aqueous solution is converted to a supercritical fluid and applied to the coal formation using a modified jet pump as described below. Conversion of the aqueous solution to a supercritical fluid is facilitated using a combination of high temperature provided by the reaction zone and/or an external heat source such as a heat exchanger or a boiler, and high pressures facilitated by the jet pump and optionally applied pressure. The pressure of the aqueous solution is 25 MPa. At well bottom, the aqueous solution is depressurised rapidly (eg over 1-2 sec) as it passes through the modified nozzle of the jet pump immediately prior to contacting the coal, reducing the pressure of the aqueous solution to 1.8 MPa. This rapid depressurisation transfers high levels of kinetic energy in the form of increased velocity or "activation" energy to the aqueous solution upon contact. The solution is also atomised as it passes through the nozzle of the jet pump. The atomised and depressurised solution retains at least some of its supercritical properties (ie the supercritical lag effect) in the very brief period of time (eg 1-2 sec) between being depressurised and contacting the coal formation. That is, the aqueous solution contacts the coal formation whilst it is undergoing supercritical lag effect such that it retains and possesses the enhanced diffusion and reduced hydrogen bonding and increased ionisation properties of the supercritical fluid, which enhances liquefaction of the coal in the reaction zone.

This combination of briefly retained supercritical properties (supercritical lag), atomisation, and enhanced velocity or kinetic energy (activation energy) facilitate particularly efficacious liquefaction of coal. Further, rapid depressurisation of the aqueous solution enables large cost savings in plant and equipment required and enables flexibility in process design.

Prophetic Example 7

Maximising Yield Under High Temperature Conditions by Avoiding Thermal Cracking of Aromatic and Hydroaromatic Rings and Retrograde Reactions The liquefaction reaction can be initiated as described above, and the temperature of the reaction zone can rise to a temperature between approximately 200° C. and 600° C. due to the exothermic nature of the liquefaction reaction. Increased temperature can enhance the rate of reaction and hence the rate of recovery liquid hydrocarbon.

Essentially, coal liquefaction may occur when the ether and methylene bridges between the clusters of aromatic rings and hydroaromatic rings in the coal matrix structure are hydrogenated. The ether and methylene bridges are more sensitive to oxidative pyrolysis (ie bond cleavage at high temperature) than the bonds within the aromatic rings themselves. Accordingly, the increased temperature facilitates oxidative pyrolysis and hydrogenation. Bonds within the aromatic volatiles which are entrained within the matrix of the coal structure are thermally ruptured, which in turn releases free radicals. These free radicals promote breaking the bridges that link the aromatic ring structure of coal molecules together into its solid structure, facilitating liquefaction. Accordingly, oxidative pyrolysis and hydrogenation occurs due to the liquefaction reaction of the present invention, producing small stable liquid hydrocarbon molecules are formed which are liquid at ambient temperature. During this process, radicals can be "capped" by the addition of a hydrogen atom. The term "capped" in this context is intended to mean bonded with, that is, the oxygen radical is bonded with a hydrogen atom.

However, temperature above approximately 500° C. may destroy natural organic aldehydes, carboxylic groups, esters and solvents released by coal into the continuing reaction solution, which promote liquefaction and enhance yield; and further, temperatures above approximately 500° C. to 550° C., may cause the coal to undergo retrograde reactions which may reduce maximum yield of liquid hydrocarbon. Retrograde reactions result in the liquid hydrocarbons reforming into solid and bituminous material which resists further liquefaction, decreasing yield. Retrograde reactions may involve unstable radicals. That is, when radicals are stabilised quickly (eg by capping with a hydrogen atom), liquefaction is enhanced, but when radicals are left unstabilised, liquid yields may be reduced. Accordingly, rapid transfer of a hydrogen atom to the coal molecules is advantageous for liquefaction processes. Advantageously, an aqueous solution containing a donor hydrogen solvent can transfer hydrogen atoms to cap ether bridges more effectively than does hydrogen gas.

Retrograde reactions may also involve "thermal cracking". The term "cracking" refers to the process whereby complex organic molecules such as coal are broken down into simpler molecules (e.g. light hydrocarbons) by the breaking of carbon-carbon bonds in the precursors in moderate temperature ranges due to longer exposure times. The structure of the hydroaromatic rings themselves, as well as their connecting linkages may crack, this is undesirable and counter productive for hydrocarbon liquids production, resulting in a higher gas:liquid ratio. "Thermal cracking" is cracking that occurs due to heat, which reduces the efficiency of binding of the hydrogen atom to the carbon atom to form liquid hydrocarbons. The rate of cracking and the end products are strongly dependent on the temperature, length of exposure time at the temperature, and the presence of any catalysts. The liquefaction reaction utilises the insulative properties of coal, such that a few centimeters below the surface of the coal in the reaction zone, the temperatures are much lower, and hence the coal below the surface of the reaction zone is advantageously protected from prolonged thermal exposure to high temperature, reducing the likelihood of thermal cracking prematurely which would promote gas formation.

Liquid hydrocarbons produced by the liquefaction reaction are thermally stable and, advantageously, are less likely to be subject to further thermal "cracking" due to heat. However, prolonged exposure to heat or prolonged residence time (eg 30 minutes to days) in the reaction zone may be undesirable as it promotes unreacted hydroaromatic rings of the coal structure to thermally crack, releasing large amounts of hydrogen which is generally consumed in the resulting formation of gases, hence promoting gas production rather than liquid hydrocarbon production. Thus, the residence time of solutions in the reaction zone may be optimised to minimise thermal cracking.

The liquefaction reaction occurs in an alkaline solvent liquid environment, which limits or slows such retrograde condensation. Further, the use of catalysts in the liquefaction process advantageously promotes capping of the hydroxyl radical with a hydrogen atom. Additionally, the use of supercritical fluid solves this problem by providing an efficient method for oxidative pyrolysis and hydrogenation.

However, the yield of liquid hydrocarbon may be optimised by regulating the temperature of the reaction zone, for example, to less than approximately 500° C.

Prophetic Example 8

Liquefaction Below Approximately 400° C.

The liquefaction reaction can be initiated as described above, and the temperature of the reaction zone can rise to a temperature between approximately 200° C. and 600° C. due to the exothermic nature of the liquefaction reaction. However, the liquefaction reaction can be regulated to occur at a desired temperature, for example, approximately 400° C. Regulating the temperature of the liquefaction reaction to approximately 400° C. may minimise the amount of methane gas that is produced during the reaction, but still facilitate the conversion of the aqueous solution to a superheated or supercritical fluid. Regulating the temperature of the liquefaction reaction in the reaction zone may occur using methods described herein.

Prophetic Example 9

Pressurising and Encapsulating a Coal Formation

Once the liquefaction reaction has been initiated by the application of the aqueous solution, the coal formation increases in tensile strength due to coal softening; whilst the impermeable nature of the unreacted coal further from the wellbore means facilitates substantial retention of the aqueous solution and pressure within the reaction zone surrounding the wellbore means. Accordingly, the reaction zone can be over pressured without subsequent over pressuring of the surrounding coal formation and without prematurely fracturing the coal body.

Additionally, the coal formation can be partially encapsulated to contain further increase the containment of the solutions, temperature and pressure within the coal formation. To partially encapsulate the coal formation, a cement slurry is injected between the coal and the surrounding formation providing a substantially impermeable and strengthened cement skin, as described herein Additionally, or alternatively, the fracture pressure of coal can be increased by "sequential fracturing and overstressing" of the coal body.

Prophetic Example 10

Jet Pump and Modification Thereto

"Jet pumps" are an oilfield technology with no moving parts downhole. The use of jet pumps facilitates the injection of the aqueous solution and the recovery of the liquid hydrocarbon in a single completed wellhead, instead of employing an injection and a recovery wellhead. The jet pump equipment enables continuous liquefaction of coal. It also facilitates recycle of heavy oil fractions back into the reaction zone for further upgrading. Produced methane gas and hydrogen gas can also be recycled back into the reaction zone to further enhance the coal liquefaction. It is possible to produce high flow rates of produce liquid hydrocarbon. A plurality of jet pumps may be employed.

A jet pump typically applies the aqueous solution to the coal formation at very high velocity, ranging from 175 msec to 240 msec, and can additionally pressurise the aqueous solution to high pressure. Thus, jet pumps can facilitate the application of large volumes of the aqueous solution at supercritical pressures and in suitable volumes. At the bottom of the well casing, where the aqueous solution is delivered to the coal formation, the supercritical or superheated aqueous solution at, for example, 25 Mpa is rapidly reduced to, for example, 1.8 Mpa by discharging the aqueous solution through a jet pump nozzle assembly, over a period of, for example, 1 sec to 0.1 msec (preferably 1-10 msec) for a "J200" model jet pump. The jet pump nozzle assembly is purpose designed for this application and comes in a wide variety of sizes, resulting in depressurisation.

The application of the aqueous solution to the coal formation by a jet pump may facilitate an efficiency or activation energy for the liquefaction of coal that is, advantageously, greater than above-ground processes. Assuming a velocity of 175 m/sec, and a discharge volume (for a J200 jet pump) of 8 L/sec, the J200 Jet Pump that can deliver aqueous solution at 8 L/sec at 175 mtr/sec, with an energy rate of 122.5 KW. A jet pump is capable of delivering 4,000 barrels/day (800,000 ltrs) of aqueous solution to the coal formation. Fluid return pressure (ie the pressure of recovered fluids) is typically 0.5-0.8 Mpa; however this may be varied by selection of jet pump mandrels and nozzle assemblies. Return pressure may be varied by backpressure control on the annulus returns and by the flowing redesign of the downhole packer and mandrel assembly. Jet pump units come equipped with accumulator and reservoir vessels and also come equipped with cyclonic separation of entrained particulate solids from the liquid hydrocarbon.

A "J300" quadplex jet pumping unit can recover approximately 4,000 barrels of liquid hydrocarbon per day, and is able to facilitate simultaneously recycling of approximately 4,000 barrels of recovered liquid hydrocarbon back into the coal formation for further liquefaction in a continuous process. In comparison, a "J200" triplex unit can recover 2,000 barrels per day while recycling another 2,000 barrels per day.

The jet pump may be modified for the for the purpose of the liquefaction reaction. The modifications are minor and involve the repositioning and redesign of the downhole packer assembly within the well. The modified jet pump comprises an isolating packer that is a dual completion packer with two threaded connection holes, with one completion for a tubing string and the jet pump, and the other completion accommodating the check valve. The first connection hole has the jet pump nozzle assembly below it and the tubing above connected to the jet pump. The second connection hole accommodates a valve which allows further pressure reduction as the fluid from the reaction area flows to surface through the annular space between the well tubing and the well casing. The jet pump nozzle assembly extends below the well casing in the well bore so that the solution makes direct contact with the coal. In contrast, the standard oil field application of jet pumps always has the jet pump nozzle assembly situated above the isolating packer and the pump fluid never contacts the oil formation. In these standard jet pumps, the velocity of the exiting pump fluid creates an area of low pressure which the isolated oil formation (below the packer) moves into the well bore to fill and then is carried to surface, now entrained in the jet pump fluid. This modification is disclosed in co-pending Australian Provisional Patent Application No. 2008903840 filed on 28 Jul. 2008 by the present inventor entitled "Inventive Jet Pumping" which is hereby incorporated by reference.

Prophetic Example 11

Set Up for a Jet Pump Equipment

Jet pumps are available as "off the shelf" oil field equipment, which can optionally be modified to increase suitability for use in the present invention as described above. A working plant can be constructed with a relatively short time scale, and the working plant can be expanded as necessary whilst remaining in production.

Once one well head is completed and functioning, to recover liquid hydrogen from that wellhead the following plant and equipment are installed: a jet pump for injecting the aqueous solution and the recovering of liquid hydrocarbon; a vent pit or flare arrangement for pressure control of the reaction zone as required; a plurality of tanks for "gunbarrel" separation of liquid hydrocarbon and water, and for storage of liquid hydrocarbon prior to shipping; flow lines connecting the above equipment; and optionally a heat exchanger.

An optimised schedule for jet pump set up is described
Day 1.

Earthworks to prepare compacted rubble base for the current tank battery, and for a current Jet pump and for a future production manifold, and for a future heat exchanger. This is not a large area, not larger than 30 m×100 m and so should be easily completed within one week.
Day 8.

A 50 tonne crane arrives on site accompanied by trucks carrying one tank each, and a truck carrying a complete jet pump. All of the tanks and the jet pump can easily be lifted into position in a single day.
Day 9.

Commence bolt ups. All of the connections on the tanks are pre-engineered bolt up connections, so that no welding or fabrication is required. Bolt ups of the tank battery can be done by a three man crew in 2 days. Concurrent with bolt ups a flare/vent pit is dug and fenced, such pits are dug by a bulldozer and are 3 blades wide and 20 m long. Digging the pit takes half a day and fencing the pit takes half a day.
Day 10.

The flowlines are connected from the jet pump to the wellhead and from the jet pump to the tank battery and from the jet pump to the vent/flare pit are all threaded connections. Again the connections are pre-engineered and no welding is required. A three man crew can complete this in a single day. A simple production manifold—each vertical pipe and valve is an additional jet pump.
Day 11.

Further earth works are performed to construct a bund wall surrounding the tanks for containment of any unforeseen spills. This work could easily be completed in 2 days (allow a week). Concurrent with the bund wall preparation will be commissioning of the jet pump. Again 2 days would be ample for this, but one week is allowed. A tank battery complete with earthen bund wall for spill containment is now present.
Day 12.

Start up and first production trials.

The start up costs for the liquefaction reaction are a tiny fraction of the costs of a Fischer Tropsh plant. A single jet pump and tanks as described above will facilitate recovery of up to 2,000 barrels of liquid hydrocarbon per day, with an additional 2,000 barrels of aqueous solution and liquid hydrocarbon being re-circulated to the wellhead. If, for example, 15 jet pumps were tied in to a common production manifold feeding to the tank battery, 30,000 barrels of liquid hydrocarbon could potentially be recovered per day. By adding more jet pumps and tanks the recovery rate can be scaled up.

Prophetic Example 12

Apparatus for Trial Liquefaction

Figure 6:
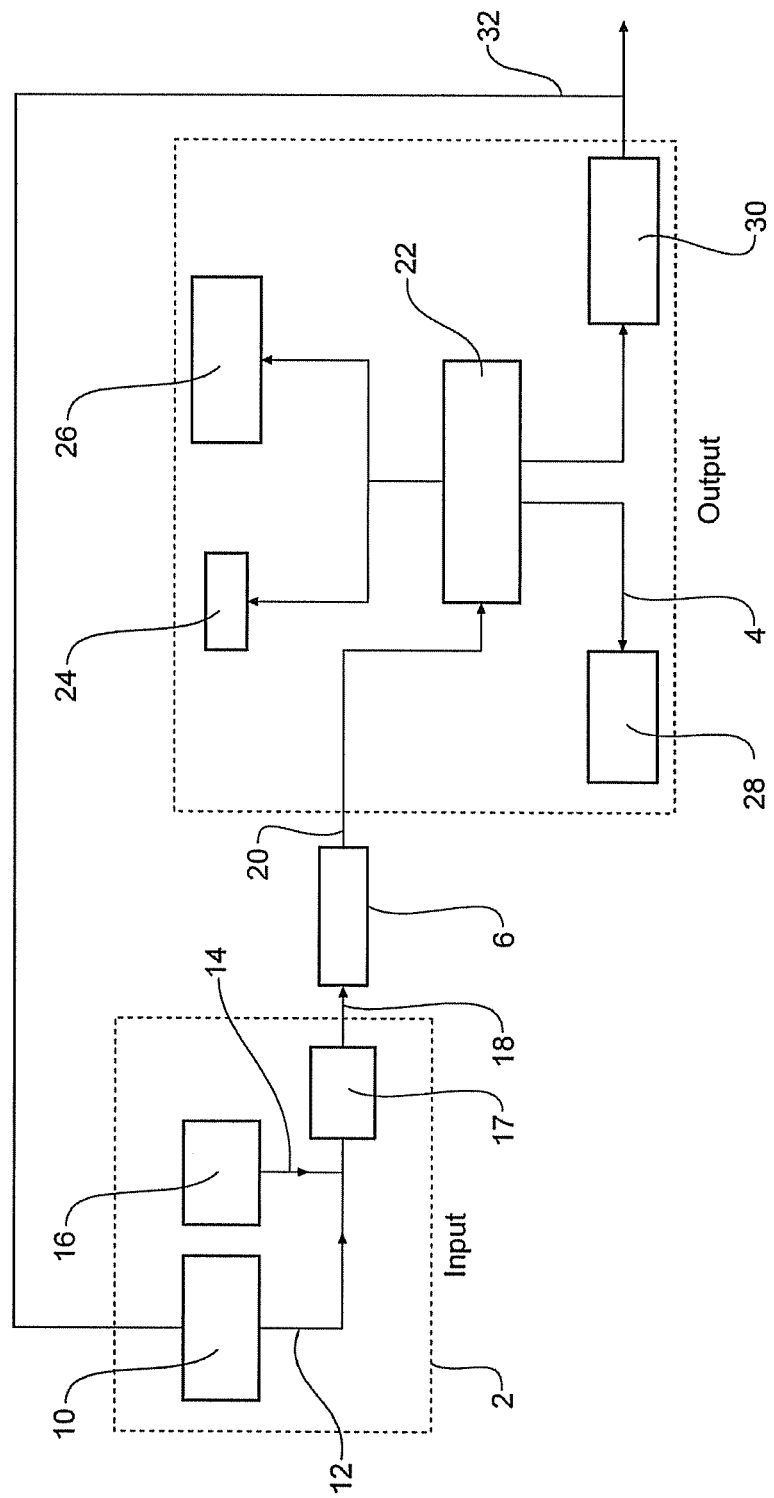
FIG. 6 provides a simplified schematic diagram of the liquefaction reaction process and the apparatus for the in situ liquefaction trial.

FIG. 6 shows a simplified schematic diagram of the liquefaction reaction process and the trial apparatus used. The apparatus includes an input apparatus section 2 and an output apparatus section 4. Between the input apparatus section 2 and the output apparatus section 4 is the liquefaction stage 6. In the input apparatus section 2, high pressure pump arrangement means 10 is provided to optionally supply an aqueous solution at high pressure. The aqueous solution, including a high pressure aqueous solution, is directed along line 12 and catalysts and/or other components and the like can be added through line 14 from supply 16. A heater arrangement 17 is provided along line 18 to optionally heat the aqueous solution to a desired high temperature. Line 18 provides the aqueous solution to a liquefaction stage 6.

In the liquefaction stage 6, the aqueous solution is directed through a nozzle assembly which may be a single nozzle or multiple nozzles towards the carbonaceous material as a high velocity fluid, for example, a high-velocity superheated fluid. The nozzle is capable of depressurising the aqueous solution. When the aqueous solution has been heated and pressurised to or near supercritical conditions and is depressurised, the aqueous solution may be delivered to the carbonaceous material as a high-velocity superheated fluid with supercritical properties. The aqueous solution reacts with the carbonaceous material and causes liquefaction of the carbonaceous material to produce a processed carbonaceous material which is composed of a hydrocarbon liquid and gases along with entrained liquid and particulate residues. These are transferred by line 20 to the output apparatus section 4. Product from the liquefaction stage 6 exits by line 20 to a recovery apparatus 22 and from which is extracted gas 24, solids 26 and oil 28. Excess liquid is transferred to waste liquid tank 30 and some liquid can be transferred on recycle line 32 back to the high pressure pump arrangement means 10 in the input apparatus stage 2.

Co-pending PCT Application entitled "Apparatus for liquefaction of Liquefaction of Carbonaceous Materials" by the present inventor teaches an apparatus for the liquefaction of carbonaceous materials using the method of the present invention or alternative method and the teaching therein is incorporated herein in its entirety.

Prophetic Example 13

Trial Liquefaction of a Coal Formation

Introduction

A trial plant for liquefying coal using the above described liquefaction reaction is to be constructed using coal in a seam to optimise conditions of liquefaction. The objectives of the trial are to verify that the long-chain hydrocarbons produced are suitable for processing within existing oil refineries without modification; to determine the composition of the gas and liquid hydrocarbons produced; to determine if the optimal product ration of 95% liquid hydrocarbons and 5% gas can occur; to verify that the liquefaction reaction results in a low percentage of $CO_2$ emissions as a result of liquefaction at relatively low temperatures (350° C.); and to verify the distance that a high-velocity superheated liquid can travel from the nozzle(s) of the injection apparatus inside the coal chamber and maintain the required properties to create liquid hydrocarbons.

Materials and Methods
Site Location and Features

The proposed trial site is located on a large private property at Balliang East, Victoria, Australia containing a large brown coal deposit. The property is located is approximately 5000 acres in size and is private land located in "Farming Zone (FZ)" in the Moorabool Planning Scheme. The trial test site is located in a former crop paddock and contains five existing wells, constructed on the site in 2005. The site is currently vacant and contains disused wells and other infrastructure left following previous trials. The site is flat with many rock floaters, sparse groundcover vegetation and scattered Sheoak trees. Balliang Creek, an intermittent watercourse in an incised valley, runs between 100 and 300 m west of the site. Five bores were constructed into the coal seam on and adjacent to the site to complete this project. Three of these existing wells are to be used to conduct the trial, and one new additional production well is to be constructed, as shown in FIG. 6.

The previous trials involved drilling five production wells (approximately 100-120 m deep), under-reaming the coal seam, hydraulic enhancement of coal seam fractures and installation of electric submersible pumps, which dewatered the coal seam over a period of several months. Prior to the previous trials, the site was used for agricultural purposes. The surrounding land is used for agricultural purposes with the adjacent properties owned by the same landholder as the trial site.

Trial Process and Apparatus

Figure 7:
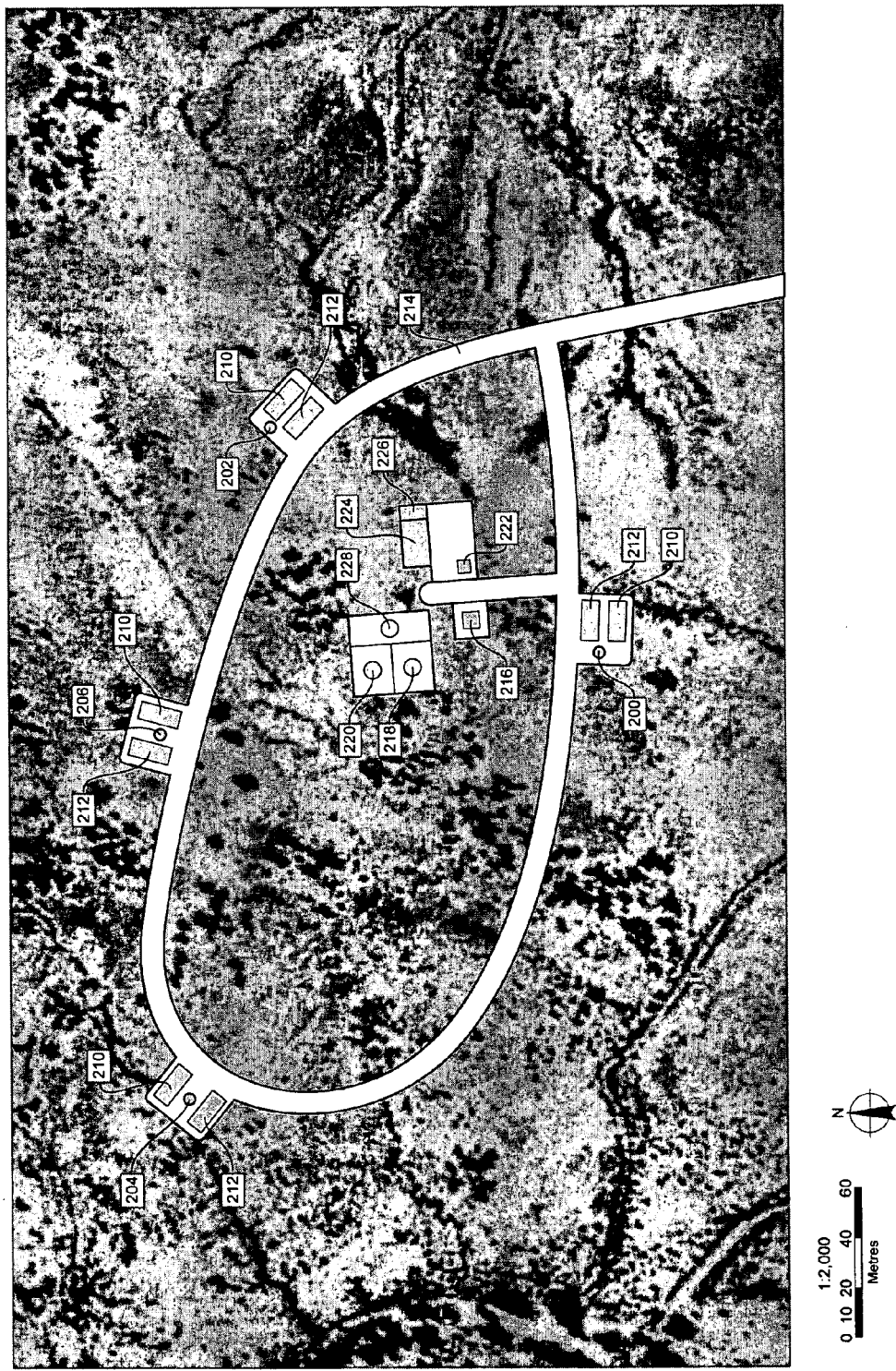
FIG. 7 provides a schematic diagram imposed over a photograph of the site to indicate the set up of the in situ liquefaction trial.

As shown in FIG. 7, three of the existing wells 200, 202, 204 will be used and an additional well 206 will be drilled to the north of the existing wells. The two southern existing wells will not be used for the trial. The trial plant as described in Prophetic Example 12 will be mounted onto one or two "skids" no larger than shipping containers that can be moved to each trial well as required, while the other non-process infrastructure and amenities will remain stationary in a central location on the site. The "intrain skid" 210 contains the input apparatus including a surge drum to hold a sufficient volume of the aqueous solution to perform the test run, a high-pressure pump for pressurising the aqueous solution, a boiler for heating the aqueous solution, and a chemical injection pump for injecting components of the aqueous solution as required. The "recovery skid" 212 contains the output apparatus including a heat exchanger (air cooled), a flash separator (to separate gaseous, aqueous and liquid hydrocarbon components) and filters. Further the site has vehicle access tracks 214, power generator, security fencing, raw chemical storage area 216, raw water storage tank 218, wastewater storage tank 220, solid waste skip 222, site office and amenities 224, a laboratory 226, and a product tank 228.

The process starts with raw water flowing to the surge drum from either the make up connection or the flash separator. The surge drum is such that it can hold the required volume of water to permit one hour of injection of water at the designed injection rate. A pump pressurises water at atmospheric conditions to the required critical pressure. This pressurised water then flows into the boiler where it may be heated to super-critical conditions. Reactants and/or catalysts can be injected into the water to form an aqueous solution at any point in the process as desired via a chemical injection pump along with the water, but preferably, the chemical injection point will be upstream of the jet pump to remove the need for high-pressure injection. The aqueous solution is then injected into the well via a nozzle which converts the high pressure super heated water into a high-velocity superheated water spray.

The liquefaction reaction is initiated by injection of an aqueous solution containing water and at least one reactant component (such as hydrogen peroxide) into the coal seam. This creates a chemical reaction that increases the temperature in the coal seam in the immediate vicinity of the well to over 300° C. As the temperature increases, the initial aqueous solution is replaced with a high-velocity superheated fluid, such as water (and optionally reactant components and/or catalysts) at approximately 300° C. to 350° C. and 500-1500 kPa with a velocity of 200 m/s, which is designed to liquefy the coal. In some test runs, the liquefaction reaction uses a high-velocity superheated water with supercritical properties, which is an aqueous solution (such as water) that has been heated and pressurised to, or near to, its supercritical point prior to being depressurised immediately before application, such that the water is at approximately 350° C. with a pressure of 0.5 to 1.5 MPa with a velocity of approximately 200 m/s, optionally containing various reactant components and/or catalysts.

Liquefied products of the reaction are then extracted via the well from the reaction zone and passed through a separator, which removes the hydrocarbon product from the output stream. The trial project consists of a series of sequential test runs using a variety of reactant components, catalysts and run cycle times, as well as temperatures and pressures of the aqueous solution. The product stream will consist of liquid hydrocarbon (eg crude oil substitute), water, gases (eg methane; hydrogen, carbon dioxide), and solids (eg inert clay impurities, fine particles of coked coal).

At the completion of each of the designed trial run-time, the input stream is stopped and the reaction products are retrieved from the well, and processed by the output apparatus. The recovered product passes through the air-cooled heat exchanger, where it is cooled to 55° C., the reduced temperature allowing the liquid fraction to condense. The liquid fraction then flows to the flash separator, where it is separated into oil product, aqueous product and gas product. The gas is vented, the aqueous product is fed into a wastewater storage tank and the oil products flow into an oil storage tank. Filters are installed on the two outlets of the flash separator to remove any solid particles for disposal.

As the trial progresses, it is possible that the heavy condensate and water will be run through the process multiple times and reinjected back down into the well stream.

Upon stopping the UCTL process, the coal face converts to phenolic tars as a result of the small residual levels of thermal liquefaction during the cool down process. This will aid in keeping the reaction zone sealed off and preventing any remaining liquids or gases from escaping from the reaction zone and potentially impacting on the environment.

Reactants and Catalysts

The following reactants and catalysts are used in the trial: hydrogen peroxide ($H_2O_2$), up to 50% solution; sodium percarbonate, as required to make up an equivalent 50% hydrogen peroxide solution; sodium perborate, as required to make up an equivalent 50% hydrogen peroxide solution; iron pyrites ($FeS_2$), up to 4% solution; iron oxide ($Fe_2O_3$), up to 4% solution; calcium oxide (CaO), up to 4% solution; sodium (Na), up to 4% solution; methanol ($CH_3OH$), up to 5% solution; aluminium oxide ($Al_2O_2$), up to 4% solution; and aluminium as powdered metal aluminium (Al). Each of these reagents are purchased from standard commercial suppliers.

Testing Program

The trial consists of 80 test runs with varying combinations of reactants, catalysts and high-velocity superheated liquid conditions in order to optimise the liquefaction reaction. The initial test runs are as described in Table 9, Table 10 and Table 11. Each of these runs will operate for approximately one hour. The test runs described in Table 12 and Table 13 initiate the liquefaction reaction using a hydrogen peroxide solution, and once the reaction zone reaches a temperature of approximately 300° C. to 350° C., a superheated or supercritical solution is injected at high velocity (for example, 200 mins/sec).

TABLE 9

Optimisation of hydrogen peroxide solution to raise temperature of the reaction zone to 350° C.; no product recirculation

| Item | Description | Test Duration | Solution Temperature (° C.) | Solution Pressure (MPa) | $H_2O_2$ | Methanol | Catalysts |
|---|---|---|---|---|---|---|---|
| 1 | Inject 2 L of 50% $H_2O_2$ solution and allow to sit for duration or until 350° C. reached | ~1 hr | Ambient | Low/gravity fed | 50% $H_2O_2$ solution | Nil | Nil |
| 2 | Inject 15 L of $H_2O_2$ solution and allow to sit for duration or until 350° C. reached | ~1 hr | Ambient | Low/gravity fed | 50% $H_2O_2$ solution | Nil | Nil |
| 3 | Inject 20 L of $H_2O_2$ solution and allow to sit for duration or until 350° C. reached | ~1 hr | Ambient | Low/gravity fed | 50% $H_2O_2$ solution | Nil | Nil |
| 4 | Inject 2 L of 50% $H_2O_2$ (perborate) and allow to sit for duration or until 350° C. reached | ~1 hr | Ambient | Low/gravity fed | 50% $H_2O_2$ from Sodium perborate | Nil | Nil |
| 5 | Inject 15 L of 50% $H_2O_2$ (perborate) and allow to sit for duration or until 350° C. reached | ~1 hr | Ambient | Low/gravity fed | 50% $H_2O_2$ from Sodium perborate | Nil | Nil |
| 6 | Inject 20 L of 50% $H_2O_2$ (perborate) and allow to sit for duration or until 350° C. reached | ~1 hr | Ambient | Low/gravity fed | 50% $H_2O_2$ from Sodium perborate | Nil | Nil |
| 7 | Inject 2 L of 50% $H_2O_2$ (percarbonate) and allow to sit for duration or until 350° C. reached | ~1 hr | Ambient | Low/gravity fed | 50% $H_2O_2$ from Sodium percarbonate | Nil | Nil |
| 8 | Inject 15 L of 50% $H_2O_2$ (percarbonate) and allow to sit for duration or until 350° C. reached | ~1 hr | Ambient | Low/gravity fed | 50% $H_2O_2$ from Sodium percarbonate | Nil | Nil |
| 9 | Inject 20 L of 50% $H_2O_2$ (percarbonate) and allow to sit for duration or until 350° C. reached | ~1 hr | Ambient | Low/gravity fed | 50% $H_2O_2$ from Sodium percarbonate | Nil | Nil |

TABLE 10

Optimisation of hydrogen peroxide (derived from sodium perborate and sodium percarbonate) with alkaline metal tests to determine degree of liquefaction; no product recirculation

| Item | Description | Test Duration | Solution Temperature (°C.) | Solution Pressure (MPa) | $H_2O_2$ | Methanol | Catalysts |
|---|---|---|---|---|---|---|---|
| | $H_2O_2$ heat up* + aluminium catalyst | ~1 hr | Ambient | Low/gravity fed | 50% Sodium perborate/percarbonate | Nil | Al metal filing [0.2%] concentration |
| | $H_2O_2$ heat up* + aluminium catalyst | ~1 hr | Ambient | Low/gravity fed | 50% Sodium perborate/percarbonate | Nil | Al metal filing [4%] concentration |
| | $H_2O_2$ heat up* + sodium catalyst | ~1 hr | Ambient | Low/gravity fed | 50% Sodium perborate/percarbonate | Nil | Sodium [0.2%] concentration |
| | $H_2O_2$ heat up* + sodium catalyst | ~1 hr | Ambient | Low/gravity fed | 50% Sodium perborate/percarbonate | Nil | Sodium [4%] concentration |

*$H_2O_2$ heat up is as optimised in Phase 1a of the trial

TABLE 11

Optimising liquefaction with supercritical or superheated high velocity water or 50% hydrogen peroxide solution (derived from sodium perborate and sodium percarbonate); no catalysts; no product recirculation

| Item | Description | Test Duration | Solution Temperature (°C.) | Solution Pressure (MPa) | $H_2O_2$ (in pre-heating phase) | Methanol | Catalysts |
|---|---|---|---|---|---|---|---|
| 10 | High velocity, high pressure, low temperature water to test equipment | 1 hr | Ambient | 28 | Nil | Nil | Nil |
| 11 | High-velocity superheated water | 1 hr | 350 | 25 | Nil | Nil | Nil |
| 12 | High-velocity supercritical water | 1 hr | 400 | 25 | Nil | Nil | Nil |
| 13 | High-velocity superheated water at higher pressure | 1 hr | 350 | 25 | Nil | Nil | Nil |
| 14 | High-velocity supercritical water at higher pressure | 1 hr | 400 | 28 | Nil | Nil | Nil |
| 15 | High-velocity superheated water at lower temperature | 1 hr | 300 | 25 | Nil | Nil | Nil |
| 16 | High-velocity superheated water at lower pressure | 1 hr | 350 | 22 | Nil | Nil | Nil |
| 17 | High-velocity superheated water at lower temperature and pressure | 1 hr | 300 | 22 | Nil | Nil | Nil |

*$H_2O_2$ heat up is as optimised in Phase 1a of the trial

TABLE 12

Optimising liquefaction with hydrogen peroxide solution (derived from sodium perborate and sodium percarbonate) in a heat up phase and then switching to supercritical or superheated high velocity water; no catalysts; no product recirculation

| Item | Description | Test Duration | Solution Temperature (°C.) | Solution Pressure (MPa) | $H_2O_2$ (in pre-heating phase) | Methanol | Catalysts |
|---|---|---|---|---|---|---|---|
| 18 | $H_2O_2$ heat up* until 350° C., then switch to high-velocity superheated/critical water# for 1 hour | Heat up + 1 hr | ~350 | ~25 | 50% sodium perborate | Nil | Nil |
| 19 | $H_2O_2$ heat up* until 350° C., then switch to high-velocity superheated/critical water# for 1 hour | Heat up + 1 hr | ~350 | ~25 | 50% sodium percarbonate | Nil | Nil |
| 20 | $H_2O_2$ heat up* until 350° C., then switch to high-velocity superheated/critical water# for 1 hour | Heat up + 1 hr | ~350 | ~25 | 50% sodium percarbonate | Nil | Nil |

*$H_2O_2$ heat up is as optimised in Phase 1a of the trial
High-velocity superheated/critical water is as optimised in Phase 1c of the trial

TABLE 13

Optimising liquefaction with hydrogen peroxide solution (derived from sodium perborate and sodium percarbonate) in a heat up phase and then switching to supercritical or superheated high velocity water with catalysts or methanol to determine if liquefaction efficiency or quality can be improved; no product recirculation.

| Item | Description | Test Duration | Solution Temperature (° C.) | Solution Pressure (MPa) | $H_2O_2$ (in pre-heating phase) | Methanol | Catalysts |
|---|---|---|---|---|---|---|---|
| 21 | $H_2O_2$ heat up*, then switch to high-velocity superheated/critical water# + Iron Pyrite-First Run | Heat up + 1 hr | 350 | 25 | 50% $H_2O_2$ solution | Nil | $FeS_2$ [0.2%] concentration |
| 22 | $H_2O_2$ heat up*, then switch to high-velocity superheated/critical water# + Iron Pyrite-Second Run | Heat up + 1hr | 350 | 25 | 50% $H_2O_2$ solution | Nil | $FeS_2$ [4%] concentration |
| 23 | $H_2O_2$ heat up*, then switch to high-velocity superheated/critical water# + Iron Oxide First Run | Heat up + 1 hr | 350 | 25 | 50% $H_2O_2$ solution | Nil | $FeO_3$ [0.2%] concentration |
| 24 | $H_2O_2$ heat up*, then switch to high-velocity superheated/critical water# + Iron Oxide Second Run | Heat up + 1 hr | 350 | 25 | 50% $H_2O_2$ solution | Nil | $FeO_3$ [4%] concentration |
| 25 | $H_2O_2$ heat up*, then switch to high-velocity superheated/critical water# + Calcium Oxide-First Run | Heat up + 1 hr | 350 | 25 | 50% $H_2O_2$ solution | Nil | CaO [0.2%] concentration |
| 26 | $H_2O_2$ heat up*, then switch to high-velocity superheated/critical water# + Calcium Oxide-Second Run | Heat up + 1 hr | 350 | 25 | 50% $H_2O_2$ solution | Nil | CaO [4%] concentration |
| 27 | $H_2O_2$ heat up*, then switch to high-velocity superheated/critical water# + Sodium-First Run | Heat up + 1 hr | 350 | 25 | 50% perborate/percarbonate | Nil | Na [0.2%] concentration |
| 28 | $H_2O_2$ heat up*, then switch to high-velocity superheated/critical water# + Sodium-Second Run | Heat up + 1 hr | 350 | 25 | 50% perborate/percarbonate | Nil | Na [4%] concentration |
| 29 | $H_2O_2$ heat up*, then switch to high-velocity superheated/critical water# + Aluminium Oxide-First Run | Heat up + 1 hr | 350 | 25 | 50% $H_2O_2$ solution | Nil | AlO [0.2%] concentration |
| 30 | $H_2O_2$ heat up*, then switch to high-velocity superheated/critical water# + Aluminium Oxide-Second Run | Heat up + 1 hr | 350 | 25 | 50% $H_2O_2$ solution | Nil | AlO [4%] concentration |
| 31 | $H_2O_2$ heat up*, then switch to high-velocity superheated/critical water# + Powdered Metal Aluminium-First Run | Heat up + 1 hr | 350 | 25 | 50% perborate/percarbonate | Nil | Al [0.2%] concentration |
| 32 | $H_2O_2$ heat up*, then switch to high-velocity superheated/critical water# + Powdered Metal Aluminium-Second Run | Heat up + 1 hr | 350 | 25 | 50% perborate/percarbonate | Nil | Al [4%] concentration |
| 33 | $H_2O_2$ heat up*, then switch to high-velocity superheated/critical water# + Methanol-First Run | Heat up + 1 hr | 350 | 25 | 50% $H_2O_2$ solution | Methanol [2%] concentration | Nil |
| 34 | $H_2O_2$ heat up*, then switch to high-velocity superheated/critical water# + Methanol-Second Run | Heat up + 1 hr | 350 | 25 | 50% $H_2O_2$ solution | Methanol [8%] concentration | Nil |

*$H_2O_2$ heat up is as optimised in Phase 1a of the trial
High-velocity superheated/critical water is as optimised in Phase 1c of the trial Once conditions are optimised, a series of four hour test runs will commence, to further test the combination of reactants, catalysts and high-velocity superheated fluid conditions (ie temperature and pressure prior to injection) to further optimise reaction efficiency and the quality of the recovered liquid hydrocarbons. Additionally, recirculation of the product stream into the well will be trialled, as well as alternate nozzle design.

Prophetic Example 14

Apparatus for Liquefaction of In Situ Carbonaceous Material

Figure 8:
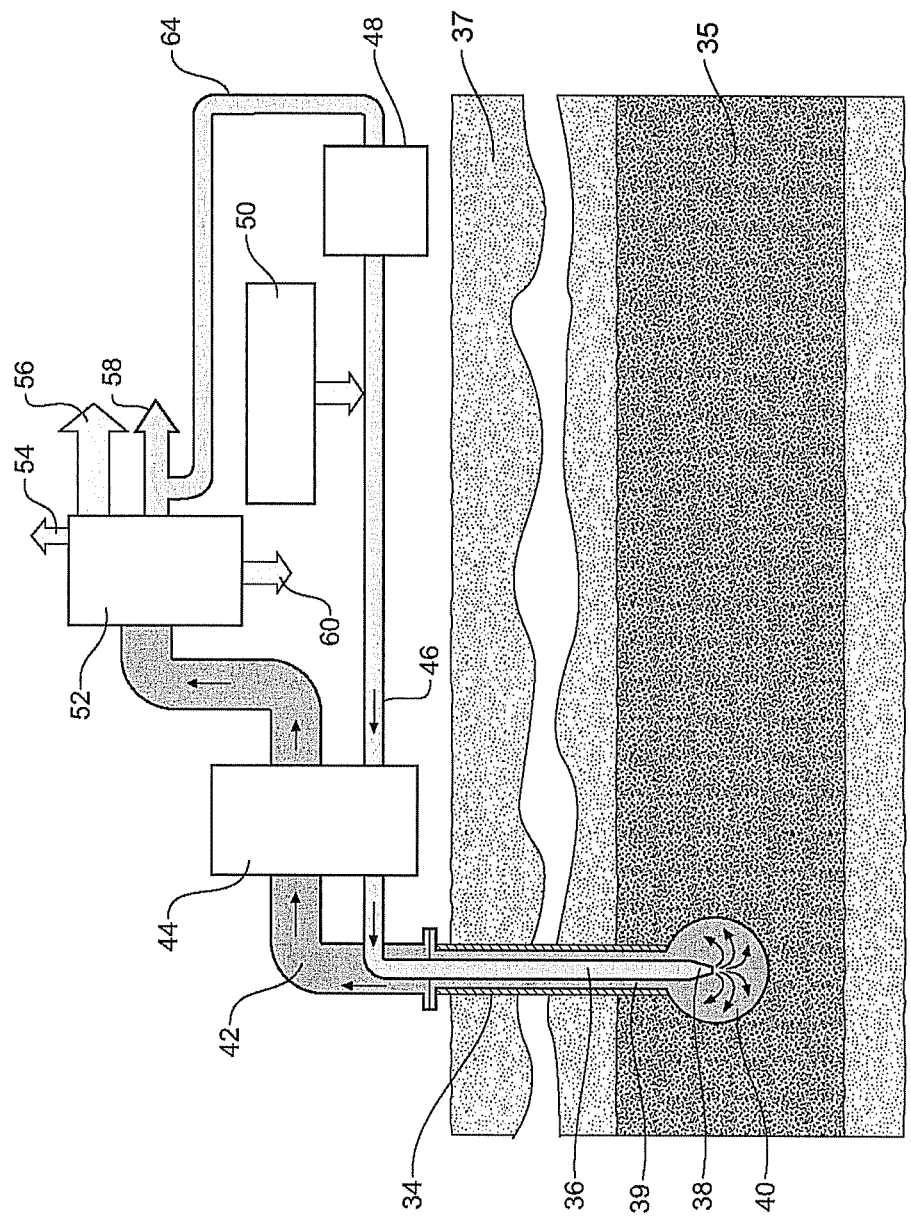
FIG. 8 provides a schematic diagram of apparatus suitable for liquefying carbonaceous material in situ in accordance with the present invention.

FIG. 8 shows the apparatus of the present invention for use with in situ liquefaction of a carbonaceous material such as coal. In this embodiment a coal seam 35 is situated below an overburden layer 37. A well casing 34 is extended through the overburden 37 into the coal seam 35. Through the well casing 34 a high pressure tubing 36 extends with a nozzle 38 which extends below the well casing 34. The space between the well casing and the high pressure tubing 36 provides an annular return space 39 for product from the in situ reaction zone 40.

In the aboveground portion of the apparatus, the reaction product of processed carbonaceous material (such as liquid hydrocarbon) which exits through the annular space 39 is transferred via pipe 42 to a heat exchanger 44. In the heat exchanger, heat from the reaction product is transferred to the aqueous solution in the high pressure liquid pipe 46 which directs aqueous solution, optionally at high pressure, into the high pressure tubing 36. The high pressure aqueous solution is supplied by high pressure pump 48. The aqueous solution can then optionally be heated by a boiler to the desired temperature.

Reactant components and catalysts can be provided from supply 50 into the high pressure line 46 to facilitate the liquefaction reaction. The nozzle 38 may be capable of depressurising a high pressure fluid to a lower pressure fluid, for example, depressurising as supercritical fluid at 25

MPa to a fluid having a pressure of 0.5 MPa to 10 MPa. The nozzle 38 is also capable of delivering the fluid at high velocity, for example 50 to 250 msec. The nozzle 38 may also be capable of delivering the fluid as a high velocity spray.

After the reaction product has been cooled in the heat exchanger 44 it goes to a gas, liquid and oil separator 52 in which gas 54, oil 56 and liquid 58 are separated and solid residue 60 is also filtered out.

A proportion of the liquid the liquid 58 is transferred by line 64 to the high pressure pump for reuse and the rest goes to waste. Carbonaceous material seams often have a high water content and hence there will be excess water to recover or send to waste.

Prophetic Example 15

Apparatus for Liquefaction of In Situ Carbonaceous Material

Coal liquefaction apparatus is set up as described in Prophetic Example 14 to liquefy a carbonaceous material formation containing a mixture of low ranked coal and oil sands. A first solution containing 50% hydrogen peroxide is applied the formation, which initiates an exothermic liquefaction reaction. The 50% hydrogen solution is applied to the formation until a temperature of approximately 350° C. is obtained. At this point, water with supercritical properties (WSP) is applied to the formation. The WSP is prepared by heating and pressurising water to approximately 385° C. and 25 MPa, and applying the fluid to the formation through a nozzle assembly that depressurises the fluid to approximately 5 MPa, and delivers the water at a velocity of approximately 200 msec. The WSP liquefies the carbonaceous material to liquid hydrocarbons, which are continuously recovered at the surface. Heat, steam and water are also recovered at the surface.

Prophetic Example 16

Apparatus for Liquefaction of In Situ Carbonaceous Material

Coal liquefaction apparatus is set up as described in Prophetic Example 14 to liquefy a carbonaceous material formation containing a mixture of low ranked coal and oil sands. A first solution containing 50% hydrogen peroxide is applied the formation, which initiates an exothermic liquefaction reaction. The 50% hydrogen solution is applied to the formation until a temperature of approximately 350° C. is obtained. At this point, water containing 5% methanol is applied to the formation as a superheated fluid with supercritical properties. The superheated fluid with supercritical properties is prepared by heating and pressurising water to approximately 350° C. and 25 MPa, and applying the fluid to the formation through a nozzle assembly that depressurises the fluid to approximately 5 MPa, and delivers the water at a velocity of approximately 200 msec. The superheated fluid with supercritical properties liquefies the carbonaceous material to liquid hydrocarbons, which are continuously recovered at the surface. Heat, steam and water are also recovered at the surface.

Although a preferred embodiment of the apparatus of the present invention has been described in the foregoing detailed description, it will be understood that the invention is not limited to the embodiment disclosed, but is capable of numerous rearrangements, modifications and substitutions without departing from the scope of the invention.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

All publications mentioned in this specification are herein incorporated by reference. Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed in Australia or elsewhere before the priority date of each claim of this application.

REFERENCES

Bergh, J. J., Cronje, I. J. Dekker, J., Dekker, T. G., Gerritsma, L. M., and Mienie, I. J. (1997) Non-catalytic oxidation of water-slurried coal with oxygen: identification of fulvic acids and acute toxicity" *Fuel*, 76 (2): 149-154

Mignot, G., Anderson, M., and Corradini, M. L. (2004) Initial Study of Supercritical Fluid Blowdown. Presented at the 16th ANS Topical Meeting on Fusion Energy, 14-16 Sep. 2004, Madison, Wis., USA Racovalis, L., Hobday, M. D., and Hodges, S. (2002) Effects of Processing Conditions on organics in wastewater from hydrothermal dewatering of low rank coal. Fuel 811369-1378.

Zhen-Xue Liu, Ze-Chang Liu, Zhi-Min Zong, Xian-Yong Wei, Jun Wang and Chul Wee Lee. (2003) GC/MS Analysis of Water-Soluble Products from the Mild Oxidation of Longkou Brown Coal with $H_2O_2$ *Energy & Fuels* 17: 424-426.

Li, Chun-Zhu (ed) (2004) *Advances in the Science of Victorian Brown Coal*, paragraph 1.3.5. Elsevier Ltd, Oxford, England

The invention claimed is:

1. A method of liquefying carbonaceous material in situ to produce liquid hydrocarbon comprising the following steps:

(a) applying a first aqueous solution to the carbonaceous material to facilitate an initial liquefaction reaction in a reaction zone in the carbonaceous material that liquefies the carbonaceous material to liquid hydrocarbon and heats the reaction zone to a desired temperature, wherein the first aqueous solution comprises components selected from the group consisting of water, hydrogen peroxide at a (w/w) concentration range between 0.1% to 70%, a solvent at a (w/w) concentration range between 0.1% to 30%, and a first catalyst; and (b) applying a second aqueous solution to the reaction zone in the carbonaceous material once the reaction zone reaches the desired temperature, wherein the second aqueous solution facilitates a continuing liquefaction reaction that liquefies the carbonaceous material to produce liquid hydrocarbon, and wherein the second aqueous solution comprises components selected from the group consisting of water, hydrogen peroxide at a (w/w) concentration range between 0.1% to 70%, a solvent at a (w/w) concentration range between 0.1% to 30%, and a second catalyst, and wherein the second aqueous solution is a fluid selected from the group consisting of a supercritical fluid and a superheated fluid, wherein the fluid is at high pressure prior to being applied to the carbonaceous material and is depressurized to a lower pressure immediately prior to being applied to the carbonaceous material.

2. The method of claim 1 wherein the first aqueous solution comprises hydrogen peroxide at a (w/w) concentration range between 20% and 40%.

3. The method of claim 1 wherein the first aqueous solution comprises hydrogen peroxide at a (w/w) concentration range between 40% and 60%.

4. The method of claim 1 wherein first aqueous solution comprises the solvent, and wherein the solvent is methanol at a (w/w) concentration range between 1% and 10%.

5. The method of claim 1 wherein the desired temperature is between 150° C. and 500° C.

6. The method of claim 5 wherein the desired temperature is between 275° C. and 375° C.

7. The method of claim 1 wherein the second aqueous solution comprises hydrogen peroxide at a (w/w) concentration range between 0.1% and 25%.

8. The method of claim 1 wherein the second aqueous solution comprises the solvent, and wherein the solvent is methanol at a (w/w) concentration range between 1% and 10%.

9. The method of claim 1 wherein the second aqueous solution is pressurized to a pressure between the critical pressure point of methanol and the critical pressure point of water prior to applying of the second aqueous solution to the carbonaceous material.

10. The method of claim 1 wherein the second aqueous solution is applied to the carbonaceous material at a velocity in the range between 50 msec and 450 msec.

11. The method of claim 10 wherein the second aqueous solution is a high-velocity superheated fluid, wherein the high-velocity superheated fluid is a high-velocity superheated fluid with supercritical properties that is obtained by the following steps:

heating and pressurizing an aqueous solution to obtain a superheated fluid; and then, passing the superheated fluid through a nozzle assembly that facilitates de-pressurizing such that the fluid has a pressure in the range approximately between 0.5 MPa and 10 MPa immediately prior to the applying of the aqueous solution to the carbonaceous material and also facilitates the applying of the aqueous solution to the carbonaceous material at a velocity in the range between 50 msec and 450 msec, such that the aqueous solution is a high-velocity superheated fluid with supercritical properties.

12. The method of claim 10 wherein the second aqueous solution is a high-velocity supercritical fluid, wherein the high-velocity supercritical fluid is a high-velocity unconfined supercritical fluid that is obtained by the following steps:

heating and pressurizing an aqueous solution to obtain a supercritical fluid; and then, passing the supercritical aqueous solution through a nozzle assembly that facilitates de-pressurizing such that the aqueous solution has a pressure in the range approximately between 0.5 MPa and 10 MPa immediately prior to the applying of the aqueous solution to the carbonaceous material and also facilitates the applying of the aqueous solution to the carbonaceous material at a velocity in the range between 50 msec and 450 msec, such that the aqueous solution is a high-velocity unconfined supercritical fluid.

13. The method of claim 1 wherein at least one of the first aqueous solution and the second aqueous solution is alkaline.

14. The method of claim 1 wherein the first catalyst and the second catalyst are independently selected from the group consisting of an iron catalyst, a molybdenum catalyst, an aluminum catalyst, a borate catalyst, sodium, pyrite, iron oxide, calcium oxide, lime, aluminum oxide, and aluminum filings.

15. The method of claim 1 further comprising recovering heat energy produced by the liquefaction reaction using an above-ground heat exchanger, wherein the recovered heat energy at least partially facilitates heating of the at least one of the first aqueous solution and second aqueous solution prior to application of the said aqueous solution to the reaction zone.

16. A method of liquefying a carbonaceous material to produce liquid hydrocarbons comprising the following steps:

(a) applying a first aqueous solution to a reaction zone in a carbonaceous material to facilitate an initial liquefaction reaction that liquefies the carbonaceous material to liquid hydrocarbon and heats the reaction zone to a desired temperature in the approximate range between 275° C. and 375° C., wherein the first aqueous solution comprises hydrogen peroxide at a (w/w) concentration range between 40% and 60% and optionally a first catalyst; and (b) applying a second aqueous solution to the reaction zone in the carbonaceous material when the reaction zone reaches the desired temperature, wherein the second aqueous solution facilitates a continuing liquefaction reaction that liquefies the carbonaceous material to produce liquid hydrocarbon, wherein the second aqueous solution comprises components selected from the group consisting of water, hydrogen peroxide at a (w/w) concentration range between 1% and 10%, methanol at a (w/w) concentration range between 2% and 8%, and a second catalyst, and wherein the second aqueous solution is a fluid selected from the group consisting of a superheated fluid and a supercritical fluid.

* * * * *